United States Patent
Das et al.

(10) Patent No.: US 10,698,625 B2
(45) Date of Patent: Jun. 30, 2020

(54) DATA PIPELINE ARCHITECTURE FOR ANALYTICS PROCESSING STACK

(71) Applicant: Accenture Global Solutions Limited, Dublin (IE)

(72) Inventors: Jagaran Das, West Bengal (IN); Srinivas Yelisetty, Fremont, CA (US); Teresa Sheausan Tung, San Jose, CA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 33 days.

(21) Appl. No.: 15/973,200

(22) Filed: May 7, 2018

(65) Prior Publication Data

US 2018/0329644 A1 Nov. 15, 2018

(30) Foreign Application Priority Data

May 15, 2017 (IN) .............................. 201741016912

(51) Int. Cl.
*G06F 3/06* (2006.01)
*G06F 9/54* (2006.01)
(Continued)

(52) U.S. Cl.
CPC .......... *G06F 3/0644* (2013.01); *G06F 3/0604* (2013.01); *G06F 3/067* (2013.01);
(Continued)

(58) Field of Classification Search
None
See application file for complete search history.

(56) References Cited

U.S. PATENT DOCUMENTS 9,306,965 B1 * 4/2016 Grossman ........... H04L 63/1416
2012/0066470 A1 3/2012 Fukada et al.
(Continued)

FOREIGN PATENT DOCUMENTS

EP 3182284 A1 6/2017

OTHER PUBLICATIONS

The First Examination Report to Australian Application No. 2016273909, dated May 31, 2017, (5p).
(Continued)

*Primary Examiner* — Tuan C Dao
*Assistant Examiner* — William C Wood
(74) *Attorney, Agent, or Firm* — Brinks Gilson & Lione

(57) ABSTRACT

A data pipeline architecture is integrated with an analytics processing stack. The data pipeline architecture may receive incoming data streams from multiple diverse endpoint systems. The data pipeline architecture may include converter interface circuitry with multiple dynamic converters configured to convert the diverse incoming data stream into one or more interchange formats for processing by the analytics processing stack. The analytics processing stack may include multiple layers with insight processing layer circuitry above analysis layer circuitry. The analysis layer circuitry may control analytics models and rule application. The insight processing layer circuitry may monitor output from the analysis layer circuitry and generate insight adjustments responsive to rule changes and analytics model parameter changes produced at the analysis layer circuitry.

20 Claims, 15 Drawing Sheets

(51) Int. Cl.
    *G06F 9/38*     (2018.01)
    *G06F 9/50*     (2006.01)
    *G06F 13/40*     (2006.01)
    *G06F 13/38*     (2006.01)
    *G06F 16/2455*     (2019.01)

(52) U.S. Cl.
    CPC .......... *G06F 9/3869* (2013.01); *G06F 9/5072* (2013.01); *G06F 9/547* (2013.01); *G06F 13/382* (2013.01); *G06F 13/4068* (2013.01); *G06F 16/24568* (2019.01)

(56) References Cited

U.S. PATENT DOCUMENTS

| | | | |
|---|---|---|---|
| 2014/0040433 A1 | 2/2014 | Russell, Jr. et al. | |
| 2014/0172929 A1 | 6/2014 | Sedayao et al. | |
| 2015/0134796 A1 | 5/2015 | Theimer et al. | |
| 2018/0203744 A1* | 7/2018 | Wiesmaier | G06F 9/4881 |
| 2018/0350354 A1* | 12/2018 | Mariaskin | G06F 17/2775 |
| 2019/0180180 A1* | 6/2019 | Tamano | G06N 5/04 |

OTHER PUBLICATIONS

Australian Patent Office, Second Examination Report for Australian Patent Application No. 2016273909, dated Nov. 6, 2017, pp. 1-3.

Fisher et al. "Spring XD Guide", (Aug. 23, 2015), obtained from the internet on Feb. 12, 2018 from URL: http://repo.spring.io/libs-release/org/springframework/xd/spring-xd/1.2.1.Release/spring-xd-1.2.1.Release-docs.zip, (Mar. 15, 2017), XP055355083 [I] 1-15.

Extended European Search Report for European Application No. 18171443.7, dated Oct. 15, 2018, pp. 1-14.

Fisher et al., "Spring XD Guide", dated Aug. 23, 2015, Retrieved from the Internet: URL: <web.archive.org/web/20150823022142/http://repo.spring.io/libs-release/org/springframework/xd/spring-xd/1.2.1.Release/spring-xd-1.2.1.Release-docs.zip> retrieved on Mar. 15, 2017, pp. 1-378.

Terracotta, "In-Genius: The first scalable in-memory platform for immediate insights and profitable action from Big Data", dated Nov. 1, 2013, Retrieved from the Internet: URL: <http://odbms.org/wp-content/uploads/2013/11/Terracotta-InGenius.pdf> retrieved on Mar. 15, 2017, pp. 1-10.

Roberts, "S2DS London 2015—Hadoop Real World" dated Aug. 17, 2015, Retrieved from the Internet: URL: <https://www.slideshare.net/seanorama/s2ds-london-2015-hadoop-real-world> retrieved on Mar. 15, 2017, pp. 1-71.

Tutorialspoint.com, "Redis Publish Subscribe" dated Sep. 11, 2014, Retrieved from the Internet: URL: <http://web.archive.org/web/20140911065922/http://www.tutorialspoint.com/redis/redis_pub_sub.htm>, retrieved on Mar. 15, 2017, pp. 1-3.

Fatahalian et al., "Sequoia: Programming the Memory Hierarch", Supercomputing, 2006. SC & APOS; 06. Proceedings of the ACM/IEEE, SC 2006 Conference, dated Nov. 1, 2006, pp. 1-13.

* cited by examiner

900

```
Application Release Date
    released  : 2015-11-17

Name of the Application
    name: ABC Data Processing Application
                        ╭─902
Processing Type ─╯
    processing: Spark-Data-Ingestion
                      ╭─904
Deployment Model ─╯
    deployment: AWS
                ╭─906
Persistence ─╯
    technique:    ultra-lambda
                          ╭─908
Sources to Connect ─╯
connector:
    source   : Kinesis
                    mode:
                    username:
                    password:
                    url:
                           ╭─910
912─╲## Different Modules ─╯
    parsers:
        type: json
        rawdata: com.accenture.analytics.realtime.DmaDTO
            modules:
                function: date-parser
                field: ## on which incoming data field we will apply date parsing
                function: custom
              ╭─914    field: ## on which incoming data field we will apply custom parsing
    transformer: ─╯
        type: procedure
            modules:
                function: date-transformer
                field: ## on which incoming data field we will apply date transformation
                function: epoch-generator
                field: ## on which incoming data field we will apply epoch transformation
```

```
                            ┌─1002
Analytical Modules ─┘
analytics:
        mode: offline         ┌─1004
        pmml: Regression.pmml─┘
        function: func()
        field: ## on which incoming field we should apply offline analytics
                       ┌─1006
Processing Rules─┘
        rule:
        mode: online      ┌─1008
        rule: ABCRule.drl─┘
                     ┌─1010
Loader Modules ─┘
        loader:
        sink: Cassandra
        rawdatastorage: com.accenture.analytics.realtime.DmaDTOWrite

Dashboard Type  ┌─1012
Chart Type     ◄┘
Layout
        dashboard:
        type: Basic
        charttype:
        layout:
                            ┌─1014
User authentication ◄┘
users:
   tom: passwd
   bob: passwd
```

Figure 10

DATA PIPELINE ARCHITECTURE FOR ANALYTICS PROCESSING STACK

PRIORITY CLAIM

This application claims priority to and incorporates by reference in its entirety Indian Patent Application No. 201741016912, filed May 15, 2017, entitled Data Pipeline Architecture for Analytics Processing Stack.

TECHNICAL FIELD

This application relates to scalable architectures with resiliency and redundancy that are suitable for analytics processing.

BACKGROUND

The processing power, memory capacity, network connectivity and bandwidth, available disk space, and other resources available to processing systems have increased exponentially in the last two decades. Computing resources have evolved to the point where a single physical server may host many instances of virtual machines and virtualized functions. These advances had led to the extensive provisioning of a wide spectrum of functionality for many types of entities into specific pockets of concentrated processing resources that may be located virtually anywhere, that is, relocated into a cloud of processing resources handling many different clients, hosted by many different service providers, in many different geographic locations. Improvements in cloud system architectures, including data processing pipelines, will drive the further development and implementation of functionality into the cloud.

BRIEF DESCRIPTION OF THE DRAWINGS

FIG. 9 shows a section of a YAML configuration file for the data pipeline architecture.

FIG. 10 shows a section of a YAML configuration file for the data pipeline architecture.

DETAILED DESCRIPTION

The technologies described below concern scalable data processing architectures that are flexible, resilient and redundant. The architectures are particularly suitable for cloud deployment, where support is needed to handle very high levels of data throughput across multiple independent data streams, with accompanying processing and analytics on the data streams. In one implementation, the architectures provide a visualization stage and an extremely high speed processing stages. With these and other features, the architectures support complex analytics, visualization, rule engines, along with centralized pipeline configuration.

Figure 1:
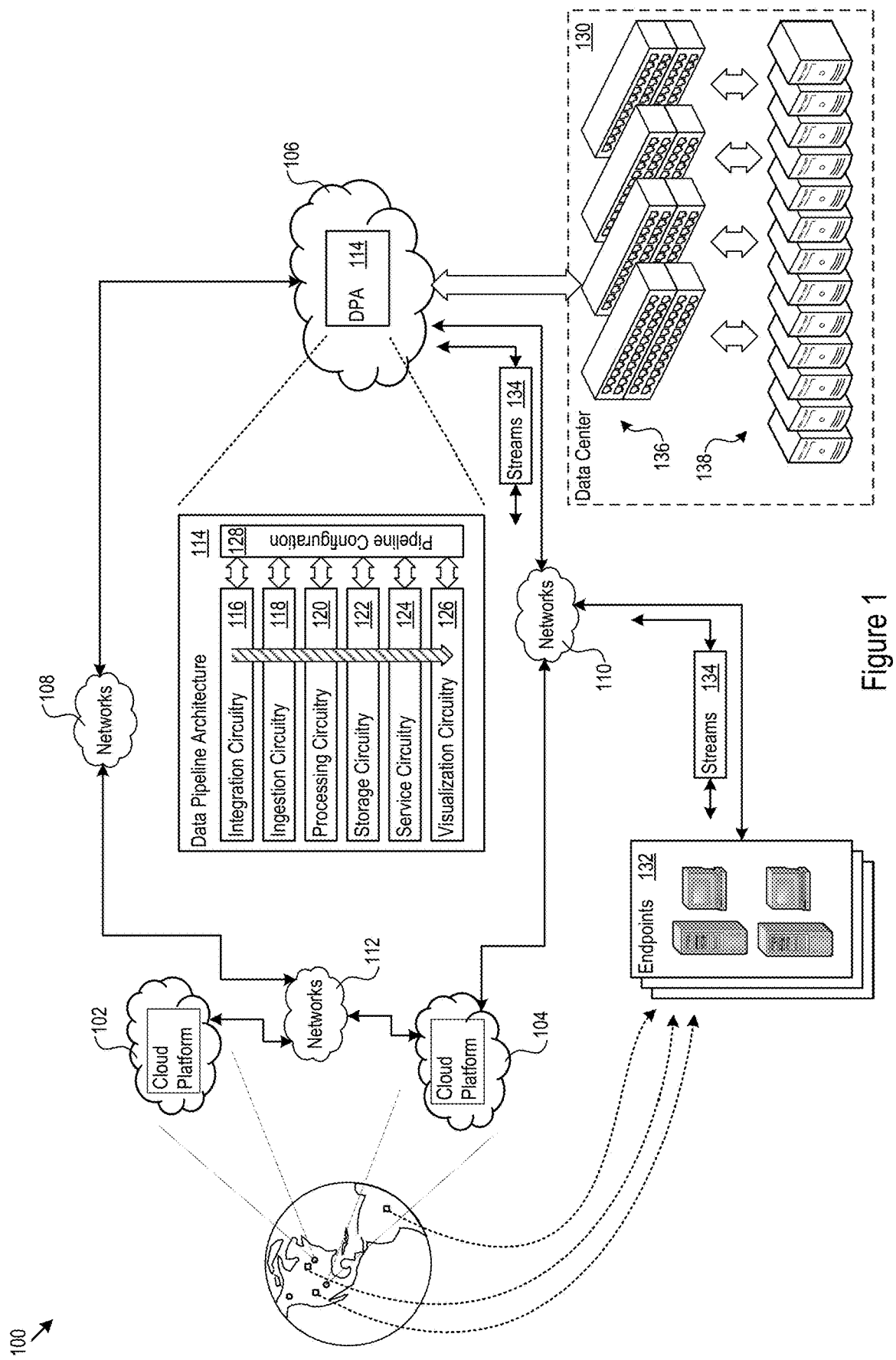
FIG. 1 shows a global network architecture.

FIG. 1 provides an example context for the discussion of technical solutions in the complex architectures described in detail below. The architectures are not limited in their application to the cloud environment shown in FIG. 1. Instead, the architectures are applicable to many other high throughput computing environments.

FIG. 1 shows a global network architecture 100. Distributed through the global network architecture 100 are cloud computing service providers, e.g., the service providers 102, 104, and 106. The service providers may be located in any geographic region, e.g., in any particular area of the United States, Europe, South America, or Asia. The geographic regions associated with the service providers may be defined according to any desired distinctions to be made with respect to location, e.g., a U.S. West region vs. a U.S. East region. A service provider may provide cloud computing infrastructure in multiple geographic locations.

Throughout the global network architecture 100 are networks, e.g., the networks 108, 110, and 112 that provide connectivity within service provider infrastructure, and between the service providers and other entities. The networks may include private and public networks defined over any pre-determined and possibly dynamic internet protocol (IP) address ranges. A data pipeline architecture (DPA) 114 provides a resilient scalable architecture that handles very high levels of data throughput across multiple independent data streams, with accompanying processing, analytics, and visualization functions performed on those data streams. Specific aspects of the DPA 114 are described in more detail below.

The DPA 114 may include integration circuitry 116 configured to connect to and receive data streams from multiple independent data sources, ingestion circuitry 118 configured to parse and validate data received by the integration circuitry 116, and processing circuitry 120 configured to create, store, and update data in a data repository defined, e.g., within the storage circuitry 122. The processing circuitry 120 is also configured to execute analytics, queries, data aggregation, and other processing tasks across scalable datasets.

The service circuitry 124 provides an integration layer between the data repository handled by the storage circuitry 122 and the visualization circuitry 126. The service circuitry 124 connects the storage circuitry 122 to the visualization circuitry 126. The visualization circuitry 126 may include any number of data rendering processes that execute to generate dynamic dashboards, complex data-driven graphical models and displays, interactive and collaborative graphics, and other data visualizations. Each of the data rendering processes communicate with the data repository through the service circuitry 124 to consume data in any source format, process the data, and output processed data in any destination format. In one implementation, the integration circuitry 116 and the service circuitry 124 execute an Apache™ Camel™ integration framework.

Pipeline configuration circuitry 128 within the DPA 114 acts as the backbone of the DPA circuitry. For instance, the pipeline configuration circuitry 128 may configure the circuitry 116-126 to perform on a data-source specific basis, e.g., analytics, data parsing and transformation algorithms, dynamic data model generation and schema instantiation, dynamic representational state transfer (REST) layer creation, specific predictive model markup language (PMML) integration points, and dynamic dashboard creation. A data serialization format like yet another markup language (YAML) may be used to implement the pipeline configuration circuitry 128. In some implementations, the pipeline configuration circuitry 128 provides a single configuration controlled processing and analytical component with a dynamic integration layer and dashboards.

As just a few examples, the DPA 114 may be hosted locally, distributed across multiple locations, or hosted in the cloud. For instance, FIG. 1 shows the DPA 114 hosted in data center infrastructure 130 for the service provider 106. The data center infrastructure 130 may, for example, include a high density array of network devices, including routers and switches 136, and host servers 138. One or more of the host servers 138 may execute all or any part of the DPA 114.

Endpoints 132 at any location communicate through the networks 108-112 with the DPA 114. The endpoints 132 may unidirectionally or bi-directionally communicate data streams 134 with the DPA 114, request processing of data by the DPA 114, and receive data streams that include processed data, including data visualizations, from the DPA 114. As just a few examples, the endpoints 132 may send and receive data streams from diverse systems such as individual sensors (e.g., temperature, location, and vibration sensors), flat files, unstructured databases and structured databases, log streams, portable and fixed computer systems (e.g., tablet computers, desktop computers, and smartphones), social media systems (e.g., instant messaging systems, social media platforms, and professional networking systems), file servers (e.g., image servers, movie servers, and general purpose file servers), and news servers (e.g., television streams, radio streams, RSS feed servers, Usenet servers, and NNTP servers). The DPA 114 supports very high levels of data throughput across the multiple independent data streams 134 in real-time and near real-time, with accompanying processing and analytics on the data streams 134.

Figure 2:
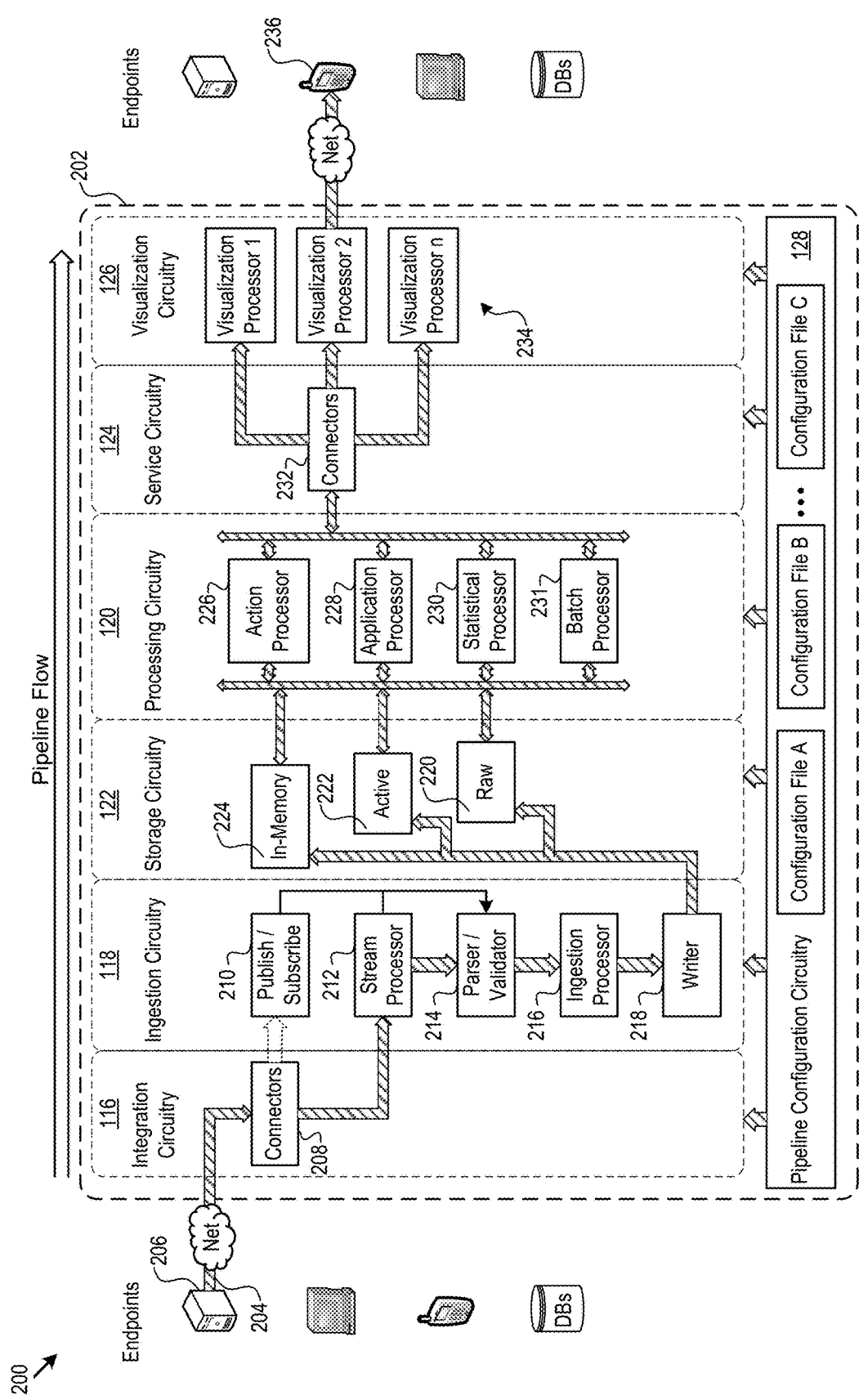
FIG. 2 shows a data pipeline architecture.

FIG. 2 shows data flow examples 200 with respect to the overall DPA architecture 202. The data stream 204 arrives from the streaming news server 206 and may include any type of data, such as stock and mutual fund price quotes. The DPA 114 processes the data stream 204 and delivers processed data (e.g., analytics or data visualizations) to the smartphone endpoint 236. The connectors 208 define interfaces within the integration circuitry 116 to accept the data stream 204 in the format defined by the streaming news server 206. The connectors 208 may implement interfaces to and from any desired data stream format via, e.g., Apache™ Camel™ interfaces. In the example in FIG. 2, the connectors 208 output Amazon Web Services (AWS)™ Kinesis Streams™ to the ingestion circuitry 118. The ingestion circuitry 118 includes the publish/subscribe message processor 210, e.g., an Apache™ Kafka™ publish/subscribe message processor as well as a stream processor 212, e.g., AWS™ Kinesis Streams™ processing circuitry.

The ingestion circuitry 118 may further include parser circuitry and validation circuitry 214. The parser may extract the structure of the data streams received from the connectors 208, and relay the structure and data to the ingestion processor 216. The implementation of the parser circuitry varies according to the formats of the data stream that the DPA 114 is setup to handle. As one example, the parser circuitry may include a CSV (comma-separated values) reader. As another example, the parser circuitry may include voice recognition circuitry and text analysis circuitry. Executing the parser circuitry is optional, for instance, when the data stream will be stored as raw unprocessed data.

The validator circuitry performs validation on the data in the data stream 204. For instance, the validator circuitry may perform pre-defined checks on fields within the data stream 204, optionally discarding or marking non-compliant fields. The pre-defined checks may be defined in a rule set in the DPA 114, for example, and customized to any specific data driven task the DPA 114 will perform for any given client or data processing scenario.

The ingestion circuitry 118 may include ingestion processing circuitry 216. The ingestion processing circuitry 216 may create and update derived data stored in the storage circuitry 122. The ingestion processing circuitry 216 may also apply pre-defined rules on the incoming data streams to create the derived data and store it in the storage circuitry 122. As one example, the ingestion processing circuitry 122 may create data roll-ups based, e.g., over a specified time or frequency. As another example, the ingestion processing circuitry 122 may create data by applying pre-determined processing rules for each data unit or data field in the data stream 204 passing through the ingestion circuitry 118. Further tasks executed by the ingestion processing circuitry 216 include aggregation of data and data compression.

The writer circuitry 218 stores the processed data, e.g., from any of the stream processor 212, parser/validator circuitry 214, and ingestion processor 216, into a repository layer defined in the storage circuitry 122. The writer circuitry 218 may selectively route the data between multiple destinations. The destinations may define a memory hierarchy, e.g., by read/write speed implemented to meet any pre-determined target processing bandwidths for the incoming data streams. For instance, the writer circuitry 218 may be configured to write data to: raw data storage 220, e.g., a Hadoop based repository, for batch analytics; an active analytics data storage 222, e.g., a Cassandra™ NoSQL repository to support ongoing analytics processing; and an in-memory data store 224, e.g., a Redis™ in-memory data structure store to support extremely fast (e.g., real-time or near real-time) data processing, with data stored, e.g. in DRAM, SRAM, or another very fast memory technology. The processed data streams may be stored in the memory hierarchy when, for instance, target processing bandwidth falls within or exceeds pre-defined bandwidth thresholds. In one implementation, the in-memory data store 224 provides higher read/write throughput than the active analytics data storage 222, which in turn provides higher read/write bandwidth than the raw data storage 220.

In the DPA 114, the processing circuitry 120 implements analytics, queries, aggregation, and any other defined processing tasks across the data sets stored in the storage circuitry 122. The processing tasks may, as examples, execute real-time analytics as the data stream 204 is received, as well as perform custom deep analytics on extensive historical datasets.

Expressed another way, the processing circuitry 120 may monitor and process the incoming data streams, e.g., in real-time. The processing circuitry 120, in connection with the other architecture components of the DPA 114, provides a framework for executing predictive analytics. In addition, the processing circuitry 120 executes rule based and complex event processing, aggregation, queries, and injection of external data, as well as performing streaming analytics and computation. In one implementation, the processing circuitry 120 includes a monitoring and alerting function that monitors incoming stream data, applies pre-defined rules on the data (e.g., Drools™ rules), and generates and sends alert messages, if a specific rule fires and species sending an alert via email, text message, phone call, GUI display, proprietary signal, or other mechanism.

The processing circuitry 120 may take its configuration from a configuration file. The configuration file may be a PMML file, for instance, provided by the pipeline configuration circuitry 128. The pipeline configuration circuitry 128 may dynamically deploy the configuration file to the processing circuitry 120 and other circuitry 116, 118, 122, 124, and 126 in the DPA 114. The configuration file decouples the processing from the specific pipeline structure in the DPA 114. That is, the configuration file may setup any of the processing by any of the circuitry 116-126 in a flexible and dynamic manner, to decouple the processing tasks from any specific underlying hardware.

The processing circuitry 120 may include a wide variety of execution systems. For instance, the processing circuitry 120 may include an action processor 226. The action processor 226 may be a rules based processing system, including a rule processing engine, a rules repository, and a rules management interface to the rule processing engine for defining and activating rules. The action processor 226 may be implemented with a JBoss Enterprise BRMS, for instance.

Another example execution system in the processing circuitry 120 is the application processor 228. The application processor 228 may be tailored to stream processing, for executing application tasks on data streams as compared to, e.g., batches of data. The application processor 228 may be implemented with Apache™ Spark Streaming™ processing.

The processing circuitry 120 shown in FIG. 2 also includes a statistical processor 230. The statistical processor 230 may be tailed specifically to statistical and data mining specific processing. In one implementation, the statistical processor 230 implements PMML processing for handling statistical and mining models defined by eXtensible markup language (XML) schema and combined into a PMML document. An additional example of processing circuitry 120 is the batch processor 231. The batch processor 231 may execute processing actions over large data sets, e.g., for processing scenarios in which real-time or near real-time speeds are not required.

The DPA 114 also provides mechanisms for connecting elements in the architecture to subsequent processing stages. For instance, the service circuitry 124 may define one or more connectors 232 that interface with the processing circuitry 120 and storage circuitry 122. The connectors 232 may be Apache™ Camel™ connectors.

There may be any number and type of subsequent processing stages. In the example of FIG. 2, the connectors 232 communicate data to the visualization circuitry 126. The visualization circuitry 126 instantiates any number of visualization processors 234. The visualization processors 234 may implement specific rendering functionality, including dynamic dashboards based on any desired pre-configured dashboard components, such as key performance indicator (KPIs). The visualization processors are not limited to generating dashboards, however. Other examples of visualization processors include processors for generating interactive charts, graphs, infographics, data exploration interfaces, data mashups, data roll-ups, interactive web-reports, drill-down multi-dimensional data viewers for, e.g., waterfall and control diagrams, and other visualizations.

The processing circuitry 116-126 in the DPA 114 may be viewed as a configurable pipeline architecture. The pipeline configuration circuitry 128 forms the backbone of the pipeline and may execute a wide variety of configurations on each part of the pipeline to tailor the execution of the DPA 114 for any specific role. For example, the pipeline configuration circuitry 128 may, responsive to any particular endpoint (e.g., the news server 206), configure the data parsing, validation, and ingestion processing that occurs in the integration circuitry 116 and ingestion circuitry 118, the type of memory resources used to store the ingested data in the storage circuitry 122, they type of processing executed on the data by the processing circuitry 120, and the types of visualizations generated by selected visualization processors 234.

The pipeline configuration circuitry 128 provides a centralized configuration supervisor for the DPA 114, which controls and configures each set of processing circuitry 116-126. In one implementation, a configuration file, e.g., a YAML file, may encode the processing configuration pushed to the DPA 114. The configuration file may control the pipeline to select between, e.g., multiple different processing modes at multiple different execution speeds (or combinations of such processing modes), such as batch processing, near real-time processing, and real-time processing of data streams; specify and configure the connectors 208 and 232 for the processing mode and speed selected; control the parsing, validation, and ingestion processing applied to the data streams; control the processing applied in the processing circuitry 120, including optionally dynamically deploying analytical models to the processing circuitry 120, and selecting the operational details of the action processor 226 (e.g., the selecting the rule sets applied by the action processor 226), the application processors 228, and the statistical processor 230.

As another example, the configuration file may specify and cause creation of specific data models in the storage circuitry 122, e.g., to create specific table structures on startup of processing any given data streams. Further, the configuration file may cause dynamic creation of integration layers with REST service layers in, e.g., the Apache™ Camel™ connectors. As additional examples, the configuration file may specify and configure an initial dashboard visualization, e.g., based on KPIs specified in the configuration file, and specify options for agent based monitoring. For instance, a process executed in the pipeline configuration circuitry 128 may monitor the progress of data streams through the DPA 114 pipeline, with logging.

Figure 3:
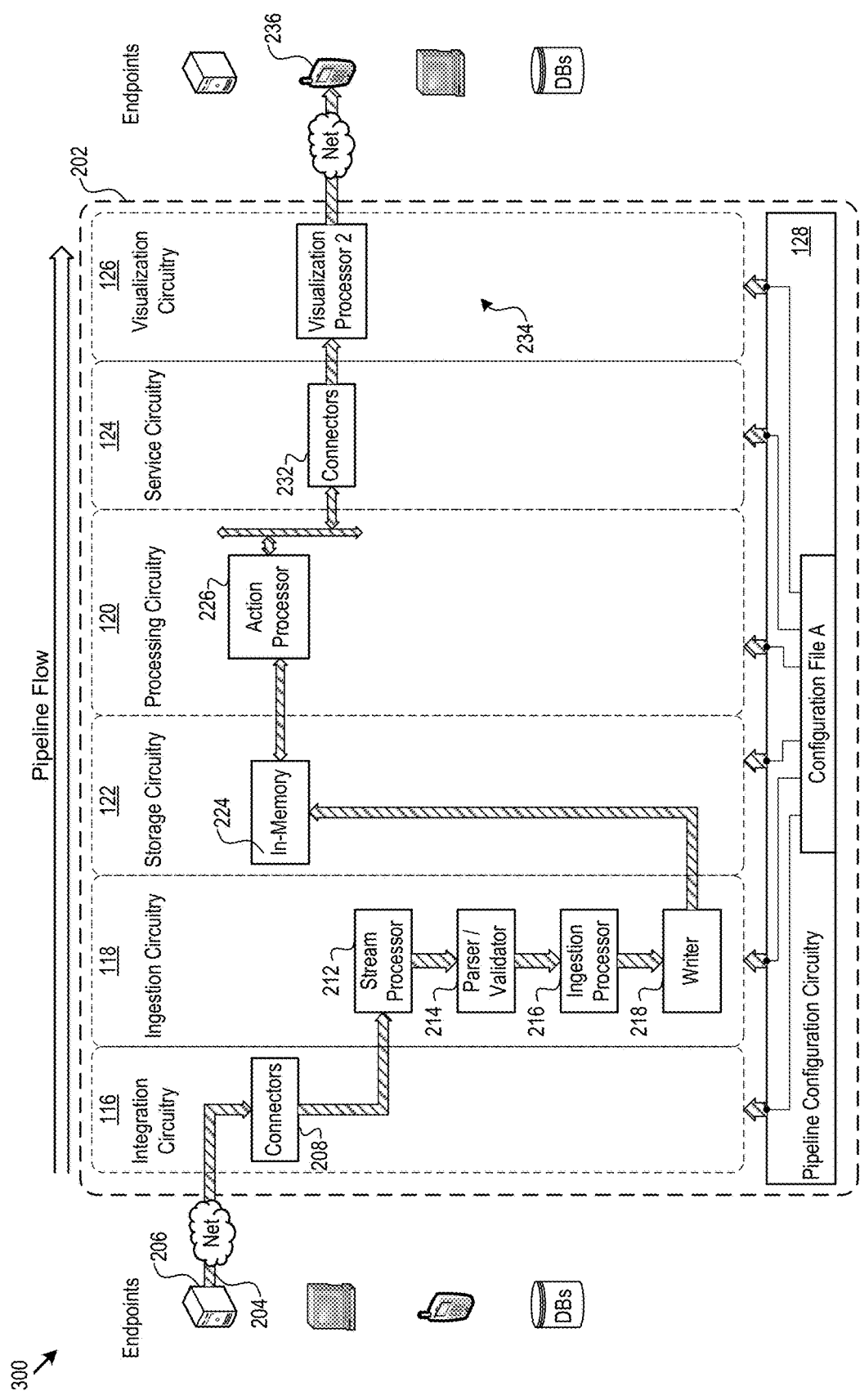
FIG. 3 shows a configuration of the data pipeline architecture according to a particular configuration applied by pipeline configuration circuitry.

FIG. 3 shows a configuration 300 of the data pipeline architecture according to a particular configuration applied by pipeline configuration circuitry 128. In this example, the configuration file A specifies the pipeline execution options for the pipeline stages. The pipeline configuration circuitry 128 reads the configuration file A and applies the execution options to each applicable set of circuitry 116-126.

Figure 4:
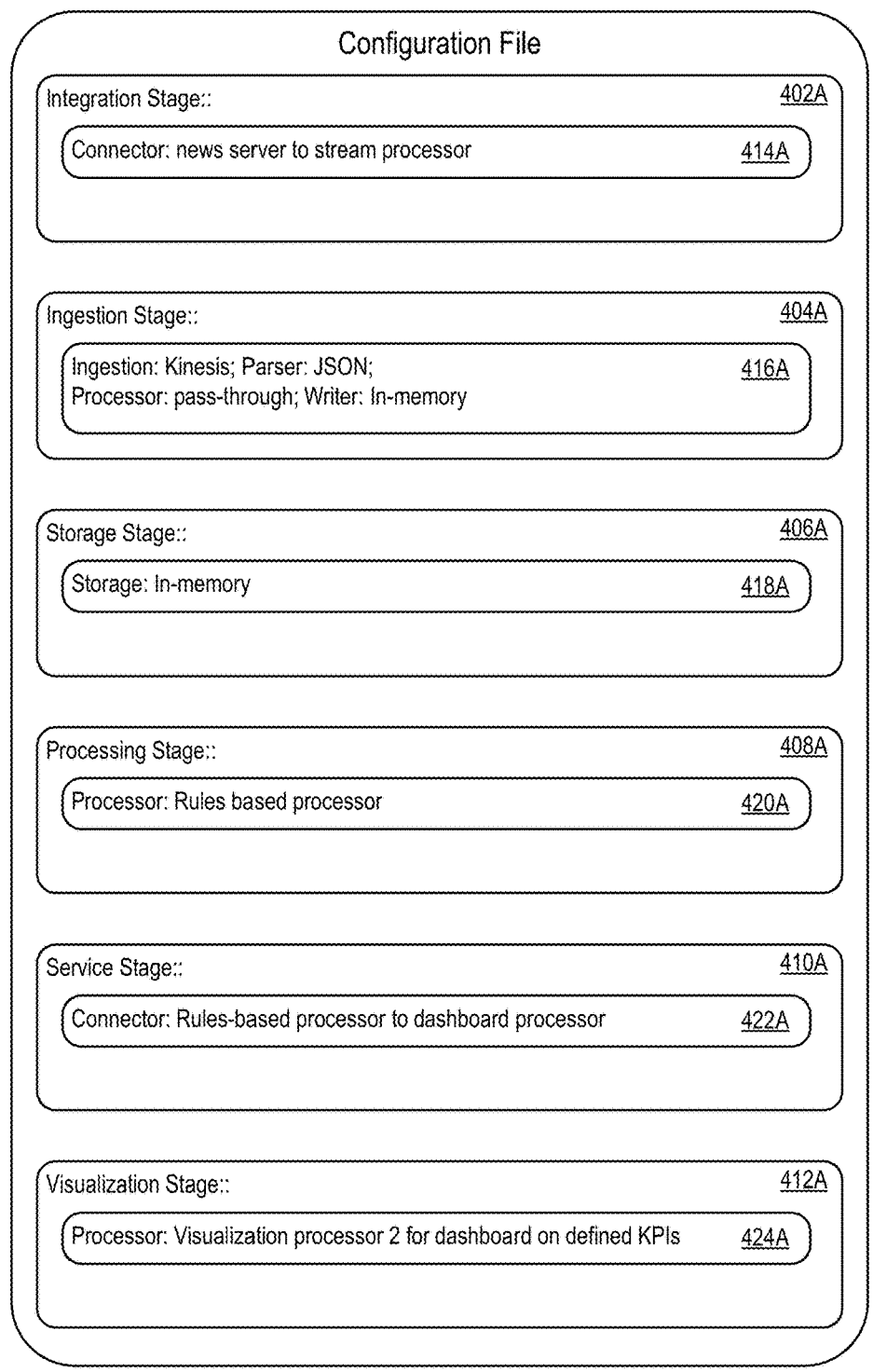
FIG. 4 shows a configuration file for the data pipeline architecture in FIG. 3.

FIG. 4 shows a corresponding example 400 of the configuration file A. The configuration file may be implemented as a YAML file, plain-text file, XML file, or any other type of file. In addition, the DPA 114 may define any set of criteria under which any given configuration file will apply. For instance, a configuration file may apply to specific sources of incoming data streams (e.g., a data stream from social media provider A), to specific types of data in the data streams (e.g., to sensor measurements), to specific times and dates (e.g., to use real-time processing during off-peak times when demand is low), to specific clients of the DPA 114 processing (e.g., specific client data streams are configured to real-time processing, or batch processing), or any other criteria.

The example 400 shows specification sections, including an integration stage section 402A, ingestion stage section 404A, storage stage section 406A, processing stage section 408A, service stage section 410A, and visualization stage section 412A. There may be additional or different sections, and configurations need not include every section, relying instead (for example) on default processing configurations applied to each processing element in the pipeline.

Within the specification sections are pipeline configuration entries. FIG. 4 shows an integration configuration entry 414A within the integration stage section 402A an ingestion configuration entry 416A within the ingestion stage section 404A, a storage configuration entry 418A within the storage stage section 406A, a processing configuration entry 420A within the processing stage section 408A, a service configuration entry 422A within the service stage section 410A, and visualization configuration entry 424A within the visualization stage section 412A. The configuration entries 414A-424A specify the pipeline execution options for one or more stages of the DPA 114.

In the example of FIGS. 3 and 4, the ingestion stage section 402A has specified using a connector in the integration circuitry 116 that accepts data streams in the format used by the news server 206, and outputs a data stream compatible with the stream processor 212. The ingestion stage section 404A specifies that the ingestion circuitry 118 will use Kinesis Streams™ through the stream processor 212, with the parser 214 configured for java script object notation (JSON), pass-through ingestion processing 216, and that the writer circuitry 218 will output ingested data to the in-memory data store 224 for very fast processing access.

The storage stage section 406A specifies the use of the in-memory data store 224 in the storage circuitry 122, and may allocate a specific size or block of memory, for example. The processing stage section 408A specifies execution of a rules based processor, e.g., via the action processor 226. The processing stage section 408A may also specify or provide the rules that the rules based processor will execute, e.g., via a uniform resource identifier (URI) into a memory or database in the DPA 114, or via a rules section in the configuration file. The initial pipeline stages are thereby setup for extremely fast, e.g., real-time or near real-time, processing of data streams with rule-based analysis.

The service stage section 410A specifies a connector in the service circuitry 124 between the rules-based processor and a dashboard processor in the visualization circuitry 126. The visualization stage section 412A specifies the visualization processor 2 specifically for rendering the dashboard on defined KPIs. The KPIs may be defined in another section of the configuration file, for example, or pre-configured in another memory or database in the DPA 114 for access by the visualization circuitry 126 at a specified URI. The visualization processor 2, in this example, transmits the dashboard to the smartphone endpoint 236.

Figure 5:
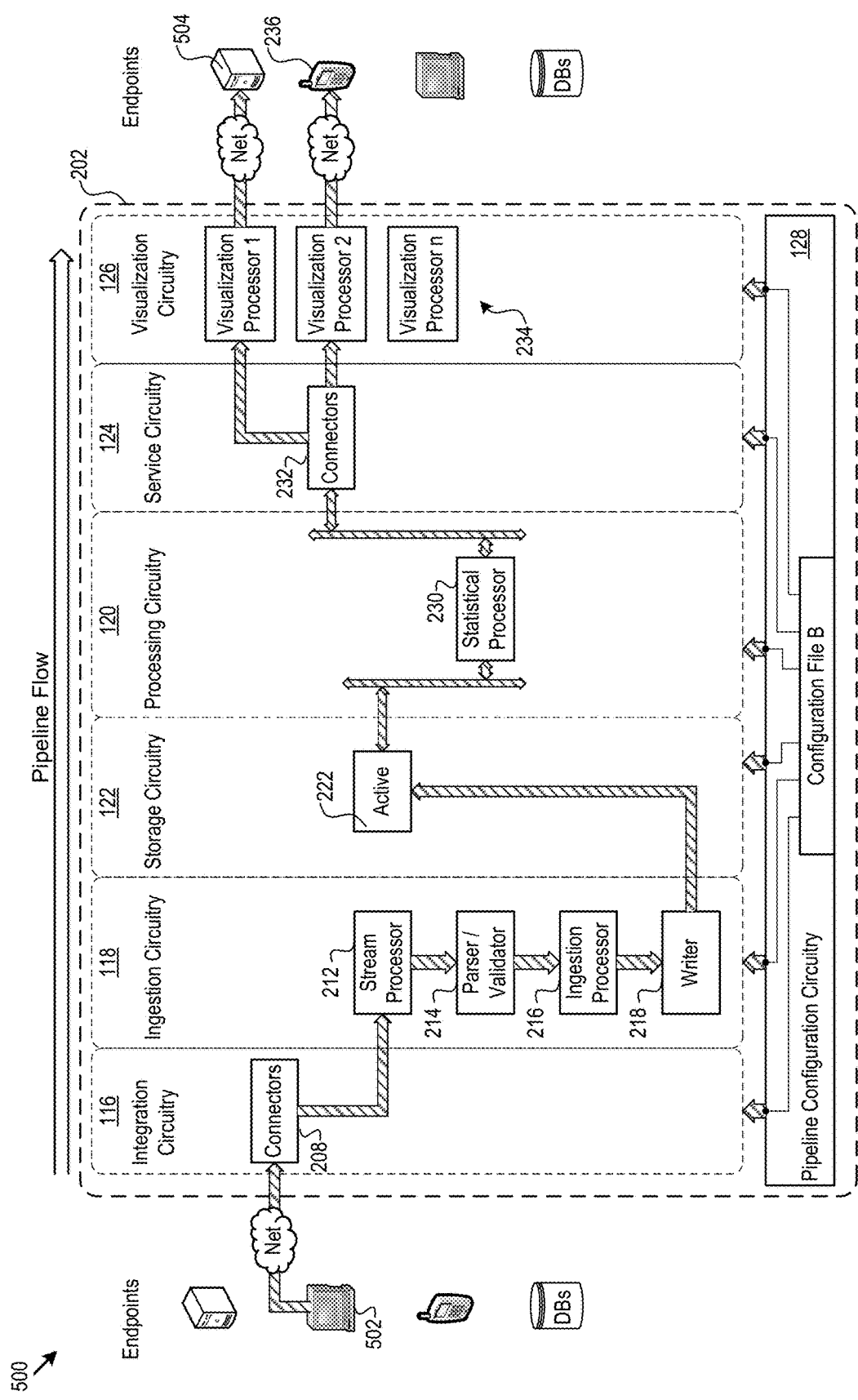
FIG. 5 shows another example configuration of the data pipeline architecture according to a particular configuration applied by pipeline configuration circuitry.
Figure 6:
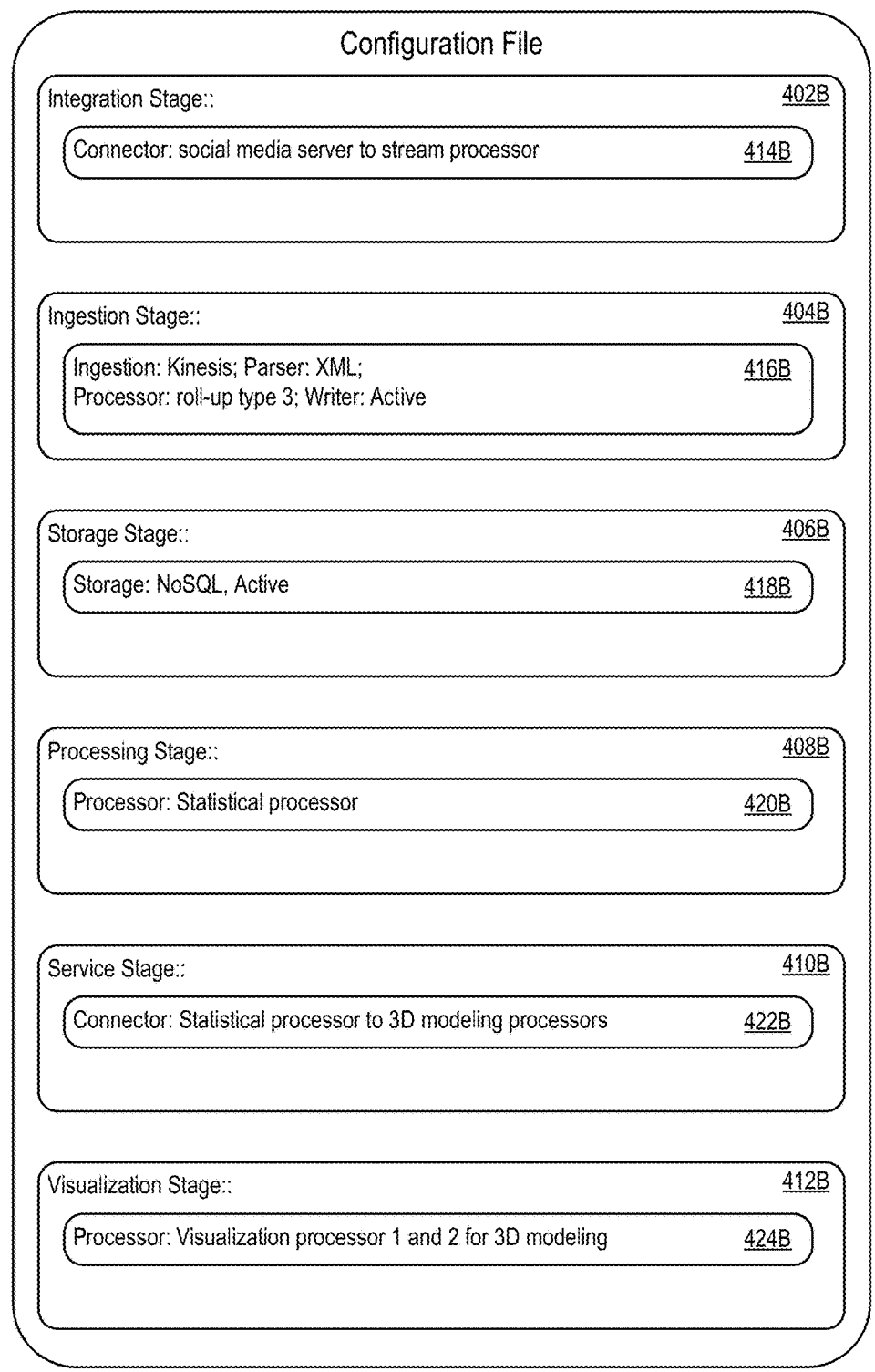
FIG. 6 shows a configuration file for the data pipeline architecture in FIG. 5.

FIG. 5 shows another example configuration 500 of the DPA 114 for a different data stream, as applied by pipeline configuration circuitry 128. In this example, the configuration file B specifies the pipeline execution options for the pipeline stages. FIG. 6 shows a corresponding example 600 of the configuration file B. The example 600 shows the specification sections described above, including an integration stage section 4026, ingestion stage section 404B, storage stage section 4066, processing stage section 408B, service stage section 4106, and visualization stage section 4126. As with any of the configuration files, there may be additional or different sections (e.g., a model section that defines or specifies via URI an analytical model for the processing circuitry 120). Configuration files need not include every section and may rely on default processing configurations applied to each processing element in the pipeline. The configuration entries 414B-424B specify the pipeline execution options for one or more stages of the DPA 114.

In the example of FIGS. 5 and 6, the ingestion stage section 4026 has specified using a connector in the integration circuitry 116 that accepts data streams in the format used by the social media server 502, and outputs a data stream compatible with the stream processor 212. The ingestion stage section 404B specifies that the ingestion circuitry 118 will use Kinesis Streams™ processing performed by the stream processor 212, with the parser 214 configured for XML parsing, data roll-up type 3 ingestion processing 216, and that the writer circuitry 218 will output ingested data to the active analytics data store 222.

The storage stage section 406B specifies the instantiation of a NoSQL data store in the active analytics data store 222 in the storage circuitry 122. The processing stage section 408B specifies execution of the statistical processor 230, e.g., for data mining the ingested data to determine trends for targeted advertising. The initial pipeline stages are thereby setup for an ongoing, near real-time, processing of data streams with data mining analysis.

The service stage section 410B specifies a connector in the service circuitry 124 between the statistical processor and a 3D modeling processor in the visualization circuitry 126. The visualization stage section 4128 specifies using the visualization processors 1 and 2 specifically for 3D modeling on the processed data. The visualization processors 1 and 2, in this example, transmit the 3D models to the targeted advertising system 504 and to the smartphone endpoint 236.

Figure 7:
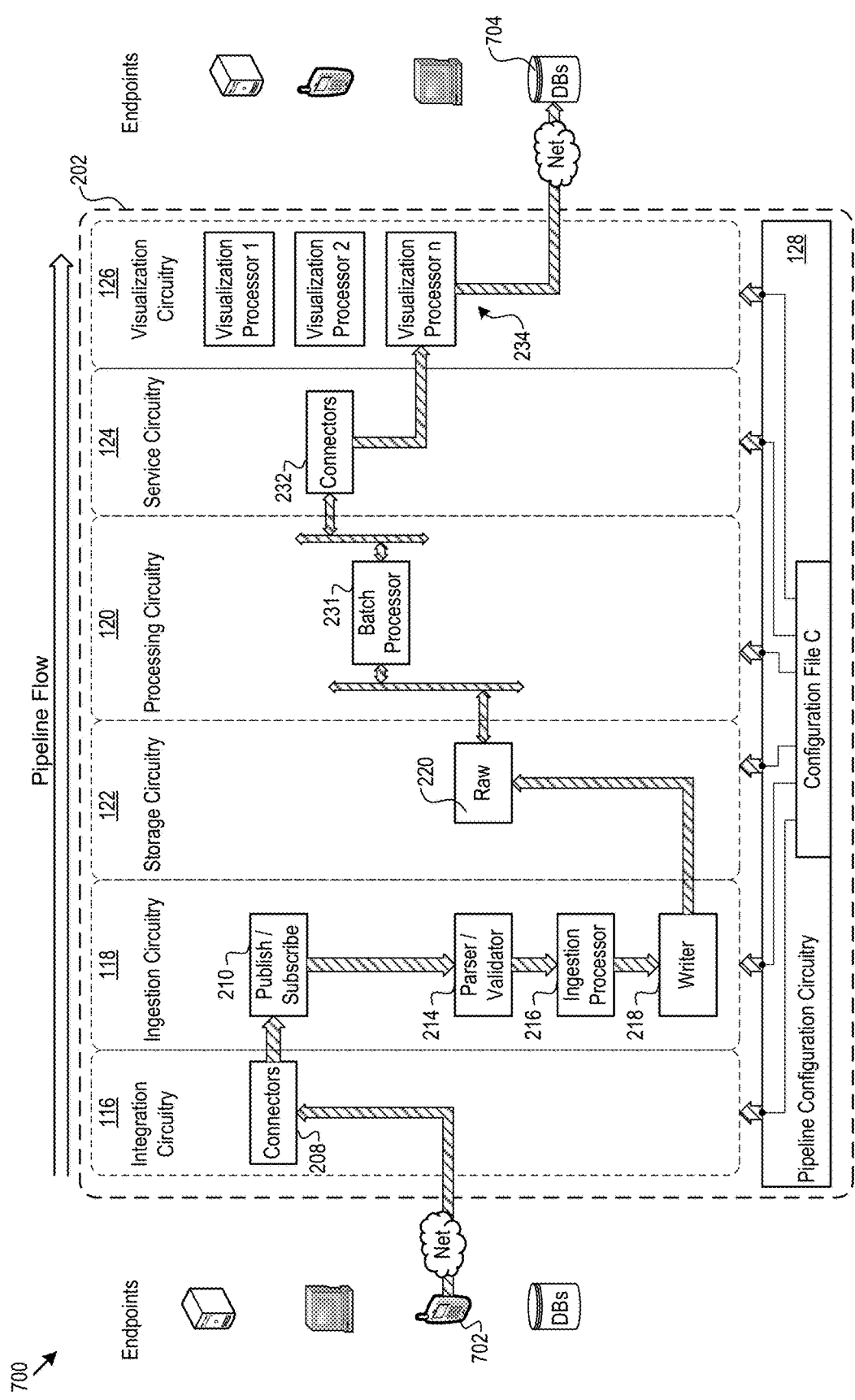
FIG. 7 shows a third configuration of the data pipeline architecture according to a particular configuration applied by pipeline configuration circuitry.
Figure 8:
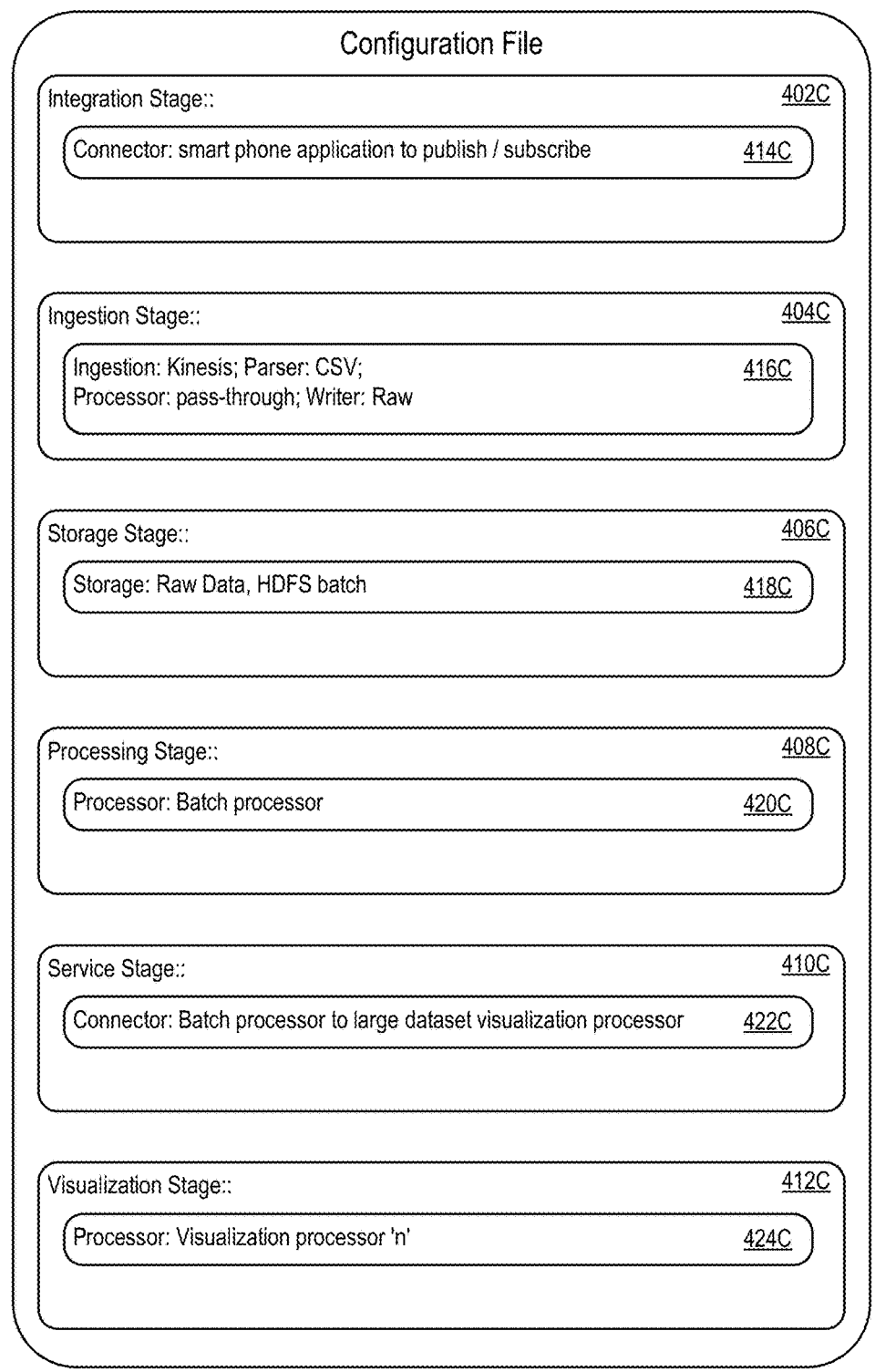
FIG. 8 shows a configuration file for the data pipeline architecture in FIG. 7.

FIG. 7 shows a third example configuration 700 the DPA 114 for applying custom processing to another type of data stream. In this example, the configuration file C specifies the pipeline execution options for the pipeline stages in the DPA 114. FIG. 8 shows a corresponding example 800 of the configuration file C. The example 800 shows the specification sections 402C-412C, as described above. The configuration entries 414C-424C specify pipeline execution options within the specification sections 402C-412C for the stages of the DPA 114.

In the example of FIGS. 7 and 8, the ingestion stage section 402C has specified using a connector in the integration circuitry 116 that accepts data streams in the format used by the smart phone application 702, and outputs a data stream compatible with the publish/subscribe message processor 210. The ingestion stage section 404C specifies that the ingestion circuitry 118 will use Kinesis Streams™ processing performed by the stream processor 212, with the parser 214 configured for CSV parsing, and pass-through ingestion processing 216. The ingestion stage section 404C further specifies that the writer circuitry 218 will output ingested data to the raw data storage 220.

In this example, the storage stage section 406C specifies an HDFS distributed java-based file system within the data management layer of Apache™ Hadoop for batch computation as the raw data storage 220 in the storage circuitry 122. The processing stage section 408C specifies execution of the batch processor 231. As one example, the batch processor 231 may perform data intensive map/reduce functions on extensive datasets across batches of data.

The service stage section 410C specifies a connector in the service circuitry 124 between the batch processor 231 and a large dataset visualization processor provided by the visualization circuitry 126. The visualization stage section 412C specifies using the visualization processor 'n' specifically for generating large dataset graphical representations on the processed data. The visualization processor 'n' transmits the rendered visualizations to a historical database 704.

Expressed another way, the pipeline configuration circuitry 128 provides a centralized configuration supervisor for the DPA 114. Configuration settings, e.g., given in a configuration file, specify the processing configuration for pipeline stages in the DPA 114. The configuration settings select between, e.g., multiple different processing modes at multiple different execution speeds (or combinations of such processing modes), including batch processing, near real-time processing, and real-time processing of data streams. The configuration settings may also control and configure connectors, parsing, validation, and ingestion processing applied to the data streams and control and configure the processing applied by the processing circuitry 120. The configuration setting may dynamically deploy, e.g., analytical models to the processing circuitry 120, rule sets for the action processor 226, and other operational aspects of the processing circuitry 120. The DPA 114 provides a whole full-scale customizable and configurable data processing pipeline architecture that may be configured for execution on a per-data stream basis through the centralized control by the pipeline configuration circuitry 128.

FIG. 9 shows a first section 900 of a YAML configuration file for the data pipeline architecture, and FIG. 10 shows a second section 1000 of the YAML configuration file for the data pipeline architecture. FIGS. 9 and 10 provide a specific example, and any configuration file may vary widely in form, content, and structure.

The first section 900 includes a Processing Type section 902. The "processing:" specifier selects between predefined processing types, e.g., Spark-Data-Ingestion, Spark-Data-Analytics, Storm-Data-Ingestion, and Storm-Data-Analytics. The pipeline configuration circuitry 128, responsive to the processing specifier, configures, e.g., the integration circuitry 116 and the ingestion circuitry 118 to implement the processing actions and data stream flow. For instance, when the processing specifier is "Spark-Data-Ingestion", the configuration circuitry 128 may instantiate or otherwise provide for data stream processing specific to Apache™ Spark data processing.

The first section 900 also includes a Deployment Model section 904. The "deployment:" specifier may be chosen from predefined deployment types, e.g., AWS, Azure, and On-Premise. The pipeline configuration circuitry 128 may execute configuration actions responsive to the deployment specifier to setup the pipeline stages in the DPA for any given configuration, e.g., a configuration specific to the expected data stream format or content for AWS.

The Persistence section 906 may include a "technique:" specifier to indicate a performance level for the DPA, e.g., batch processing, near-real time (lambda), or real-time (ultra-lambda). The pipeline configuration circuitry 128 modifies the storage circuitry 122 responsive to the Persistence section 906. For instance, for higher performance configurations (e.g., near-real time), the pipeline configuration circuitry 128 may establish in-memory 224 data stores for processing rules and analytics, with the data in the in-memory 224 data store flushed to the active store 222 on a predetermined schedule. For other performance configurations (e.g., near-real time), the pipeline configuration circuitry 128 may store data in the active store 222, then flush that data to the raw data store 220 (e.g., HDFS). As another option, the technique may specify a mix of performance modes, responsive to which the pipeline configuration circuitry 128 stores the data to be processing in the in-memory store 224, and also in the active store 222. In this scenario, the DPA 114 may flush the data into the raw data store 220 when a predefined condition is met, e.g., after a threshold time, size, or time+size is met.

The Sources section 908 may include a "connector:" specifier to inform the DPA 114 about the source of the data streams. The connector options may include source specifiers such as Kinesis, Kafka, and Flume, as a few examples. The Sources section 908 may further specify connection parameters, such as mode, username, password, URLs, or other parameters. The Modules section 910 may specify parses to implement on the data stream, e.g., in the integration circuitry 116 and ingestion circuitry 118. Similarly, the Modules section 910 may specify parsers 912 (e.g., JSON, CSV, or XML) and transformers 914 to implement on the data stream in the integration circuitry 116 and the ingestion circuitry 118.

In the example shown in FIG. 9, a "parser:" specifier directs the DPA 114 to use a JSON parser, with metadata configuration specified at "com.accenture.analytics.realtime.DmaDTO". The "function:" specifiers direct the DPA 114 to perform specific actions, e.g., date parsing on specific data fields in the data stream, or any type of custom processing, again on a specified data field in the data stream. Similarly, the "transformer:" specifier directs the DPA 114 to use functions for transformation, e.g., stand-alone functions available in pre-defined library. Two examples are the date-transformer function and the epoch-transformer function specified to act on specific fields of the incoming data stream.

The Analytical Model section 1002 directs the DPA 114 to perform the specified analytics 1004 in a given mode, e.g., "online" mode or "offline mode". For online mode, the pipeline configuration circuitry 128 may configure the DPA 114 to perform analytics on the data stream as it arrives. For offline mode, the pipeline configuration circuitry 128 may configure the DPA 114 to perform analytics on static data saved on disc in the storage circuitry 122. For example in offline mode, the DPA 114 may execute Java based Map-Reduce/Pig scripts for analytics on HDFS data.

In some implementations, the configuration file may use a Business Rules section 1006 to specify that the processing circuitry 120 apply particular rules to the data stream. The Business Rules section 1006 may specify, e.g., online or offline execution as noted above. The Business Rules section 1006 may further specify a rules file 1008 in which the processing circuitry 120 should retrieve the rules to apply.

The Loader section 1010 may be included to specify options for data persistence. For instance, the Loader section 1010 may specify storage specific metadata for the persistence, e.g. to map data to particular data stores according to the metadata. The "rawdatastorage" parameter may specify, e.g., a database to JSON mapping (or any other type of mapping) in connection with the persistence operation.

Further, the configuration file may include any number of Visualization sections 1012. The Visualization sections 1012 may specify processing options for the visualization circuitry 126. Example options include Dashboard type, e.g., Basic or Advanced; Visualization types, e.g., pie chart, block chart, or Gantt chart; Visualization layout, e.g., dashboard or spreadsheet. Note also that the configuration file may include a User authentication section 1014, which provides username and password (or other credentials) for use by the DPA 114 to allow access or use by certain people of the DPA 114.

Figure 11:
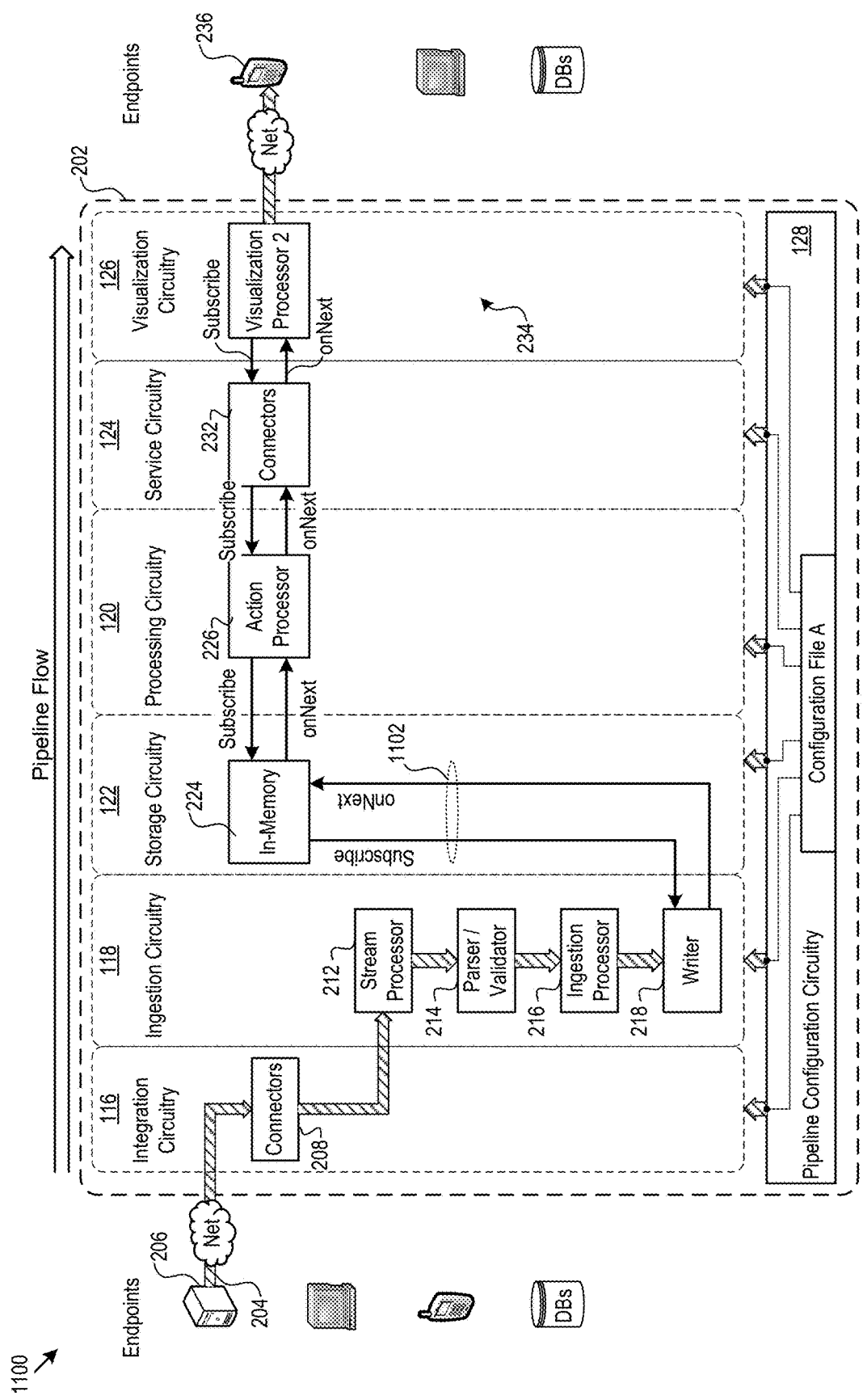
FIG. 11 shows a data pipeline architecture in which the processing stages include subscribe and publish interfaces for processing asynchronous data flows.

FIG. 11 shows a data pipeline architecture 1100 in which the processing stages include subscribe and publish interfaces for processing asynchronous data flows. For instance, the pipeline stages may implement Reactive Java subscription and events to create a pipeline architecture that processes asynchronous data flow through the pipeline stages. In such an implementation, any given component of any given stage performs its processing in a reactive manner, when a prior stage has generated an output for consumption by the following stage.

As an example, FIG. 11 shows a reactive interface 1102 defined between the storage circuitry 122 and the ingestion circuitry 118. In particular, the reactive interface 1102 establishes a subscription relationship between the in-memory data store 224 and the writer circuitry 218. Additional reactive interfaces are present between the processing circuitry 120 and the storage circuitry 122, the service circuitry 124 and the processing circuitry 120, and the visualization circuitry 126 and the service circuitry 124.

Note that reactive interfaces may be defined between any pipeline components regardless of stage. One consequence is that the reactive interfaces may implement non-serial execution of pipeline stages. For instance, the processing circuitry 120 may establish a reactive interface to the writer circuitry 218 in addition to the in-memory data storage 224. As a result, the processing circuitry 120 may listen to, observe, and perform processing on event emitted by the writer circuitry 218 without waiting for the in-memory data storage 224.

Through the reactive interface 1102, the in-memory data store 224 receives an event notification when the writer circuitry 218 has completed a processing task and has an observable element of work product ready. Expressed another way, the in-memory data store 224 listens to the stream of objects completed by the writer circuitry 218 and reacts accordingly, e.g., by quickly storing the completed object in high speed memory. A stream may be any sequence of ongoing events ordered in time, and the stream may convey data (e.g., values of some type), errors, or completed signals.

The stream processing implemented by any of the pipeline components may vary widely. In some implementations for some components, one or more streams of observables may connected as inputs to other streams, streams may be merged to create a merged stream, streams may be filtered to retain only events of interest, or data mapping may run on streams to create a new stream of events and data according to any predefined transformation rules.

The processing in the data pipeline architecture 1100 captures the events asynchronously. For instance, with reference again to the in-memory data storage 224, it may define a value function that executes when a value observable is emitted by the writer circuitry 218 (e.g., a function that stores the value in high-speed memory), an error function that executes when the writer circuitry 218 emits an error observable, and a completion function that executes when the writer circuitry 218 emits a completion observable. These functions are the observers that subscribe to the stream, thereby listening to it.

Figure 12:
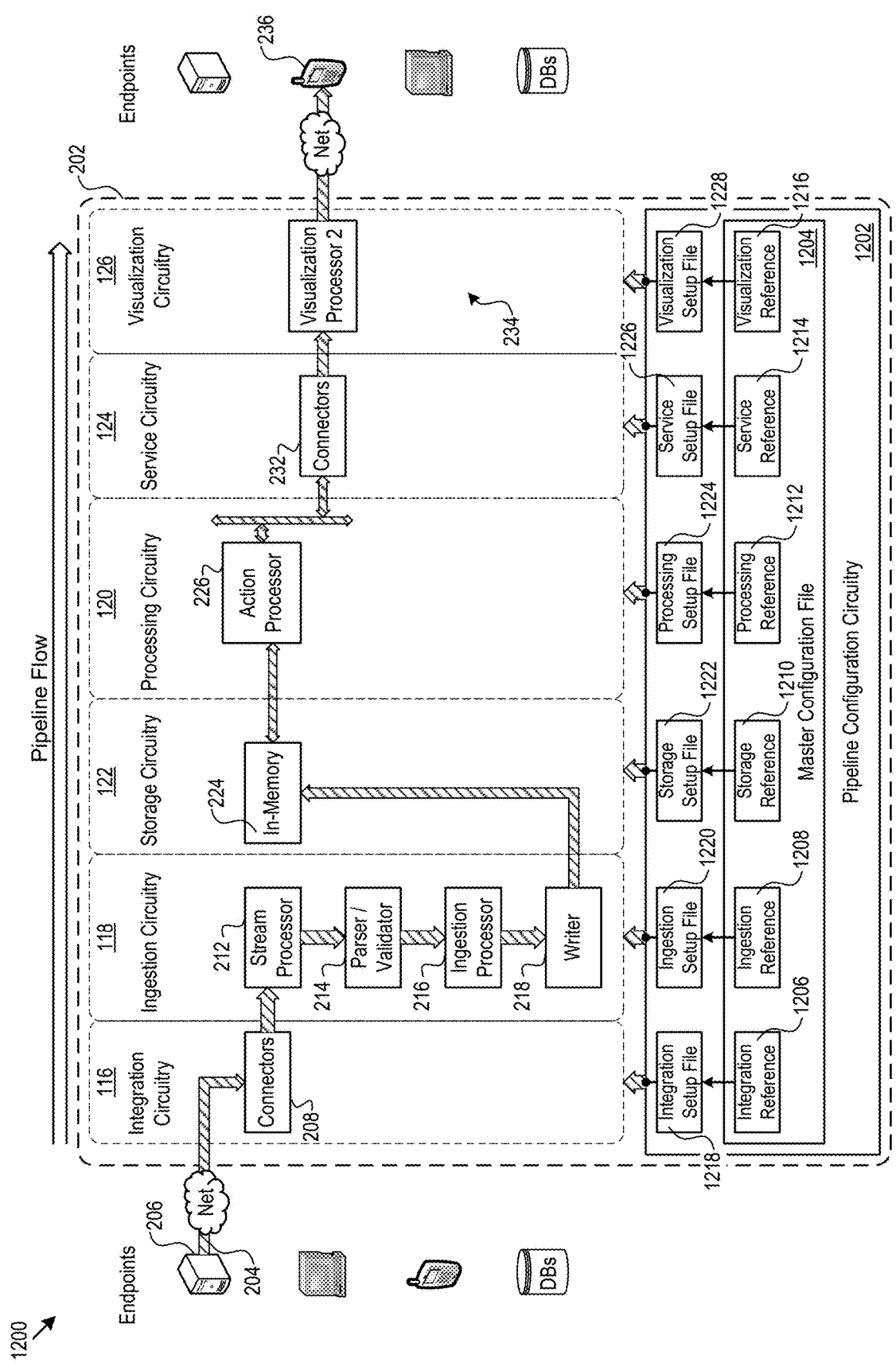
FIG. 12 shows a data pipeline architecture with a configuration established by a referential XML master configuration file.

FIG. 12 shows a data pipeline architecture 1200 with a configuration established by a referential master configuration file 1204 (e.g., an XML or YAML file) processed by the pipeline configuration circuitry 1202. The referential master configuration file 1204 has established the same pipeline processing as shown in FIG. 3. The architecture of the master configuration file 1204 is different, however, as explained below In particular, the master configuration file 1204 has an internal structure that references additional, external, configuration files. In the example in FIG. 12, the master configuration file 1204 itself includes references to the external configuration files, including an integration reference 1206, an ingestion reference 1208, a storage reference 1210, a processing reference 1212, a service reference 1214, and a visualization reference 1216. These references, respectively, point to the following configuration files: an integration setup file 1218, an ingestion setup file 1220, a storage setup file 1222, a processing setup file 1224, a service setup file 1226, and a visualization setup file 1228. Any of the setup files may be XML, YAML, or other type of file.

The configuration files in FIG. 12 correspond to individual processing stages in the pipeline, and may address configuration options throughout an entire stage. However, configuration files referenced by the master configuration file 1204 may correspond to any desired level of granularity of control and configuration. As examples, there may be individual configuration files defined to configure the visualization processor 2, the action processor 226, the in-memory storage 224, and the stream processor 212.

The external configuration files may provide parameter settings and configuration options for any component in the data pipeline architecture (e.g., the visualization processors) or for bundles of components that may be present in any pipeline stage (e.g., the ingestion stage 118). That is, the master configuration file 1204 references configuration settings specified in other files for the configuration of pipeline stages in the DPA 1200. As just a few examples, the configuration settings select between, e.g., multiple different processing modes at multiple different execution speeds (or combinations of such processing modes), including batch processing, near real-time processing, and real-time processing of data streams. The configuration settings may also control and configure connectors, parsing, validation, and ingestion processing applied to the data streams and control and configure the processing applied by the processing pipeline stage. The configuration setting may dynamically deploy, e.g., analytical models to the processing pipeline stage, rule sets for the processing stage, and other operational aspects. The DPA 1200 provides a whole full-scale customizable and configurable data processing pipeline architecture that may be configured for execution on a per-data stream basis through the centralized control by the master configuration file 1204.

As examples, Tables 1-10 show XML pseudocode configuration file sets.

The prediction master configuration file, shown in Table 1, of the first configuration file set (Tables 1-6), points to the analytics (Table 2), connector (Table 3), writeservice (Table 4), engine prediction (Table 5), and validator prediction (Table 6) XML files. Accordingly, within this example configuration file set, the prediction master configuration file of Table 1 may fill the role of the master configuration of FIG. 12 for the first configuration file set by referencing external files.

Table 1 below shows an example prediction master configuration file.

Table 1: Example Prediction Master Configuration File

```xml
<?xml version="1.0" encoding="UTF-8"?>
<!--
  This is the primary configuration file for RTAF pipeline.
  Purpose:
    1) Specify the building block/modules of the entire pipeline
    2) Specify the global configuration file holding configurable
       options for all the modules
  Date of creation:
    10th May, 2016
  version: 1.0
-->
<pipeline name="RtafPipeline">
    <!--<configuration
      name="pipeline_config_prediction.properties"
      config_location="s3" bucket_name="aip-rtaf-pipeline-modules"/>-->
    <!--<configuration
      name="pipeline_config_prediction.properties"
      config_location="dynamodb"
      bucket_name="arn:aws:dynamodb:us-east-1:
        533296168095:table/rtaf_aws_pipeline_config"
      />-->
    <configuration
      name="pipeline_config_prediction.properties"
      arn="arn:aws:dynamodb:us-east-1:533296168095:
        table/rtaf_aws_pipeline_config" />
    <!--<module name="connector"
      config="connector.xml"
      config_location="classpath"
      bucket_name=" "/>-->
    <module name="connector"
      config="connector.xml" config_location="s3"
      bucket_name="aip-rtaf-pipeline-modules/prediction_pipeline" />
    <!--<module name="validator"
      config="validator_prediction.xml"
      config_location="classpath"
      bucket_name=" "/>-->
    <module name="validator"
      config="validator_prediction.xml"
      config_location="s3"
      bucket_name="aip-rtaf-pipeline-modules/prediction_pipeline"/>
    <!--<module name="analytics"
      config="analytics.xml"
      config_location="classpath"
      bucket_name=" "/>--><!--bucket_name="aip-rtaf-pipeline-modules"-->
    <module name="analytics"
      config="analytics.xml"
      config_location="s3"
      bucket_name="aip-rtaf-pipeline-modules/prediction_pipeline"/>
    <!--<module name="rule_engine_prediction"
      config="rule_engine_prediction.xml"
      config_location="classpath" bucket_name=" "/>-->
    <module name="rule_engine_prediction"
      config="rule_engine_prediction.xml"
      config_location="s3" bucket_name="aip-rtaf-pipeline-modules/prediction_pipeline"/>
    <!--Write service module to persist raw data
    <module name="raw_data_writeservice"
      config="raw_data_writeservice.xml"
      config_location="classpath"
      bucket_name=" " I>-->
    <!--Write service module to persist forecast data-->
    <!--<module name="prediction_writeservice"
      config="prediction_writeservice.xml"
      config_location="classpath"
      bucket_name=" "/>-->
    <module name="prediction_writeservice"
      config="prediction_writeservice.xml"
      config_location="s3"
      bucket_name="aip-rtaf-pipeline-modules/prediction_pipeline"/>
    <!--<module name="analytics"
      config="https://s3.amazonaws.com/aip-rtaf-pipeline-modules/analytics/analytics_manifest.xml"
      config_location="s3"
      bucket_name="aip-rtaf-pipeline-modules" I>
    -->
</pipeline>
```

Table 2 shows an example analytics XML file that is referenced in the example prediction master configuration file of Table 1.

Table 2: Example Analytics XML File

```xml
<?xml version="1.0" encoding="UTF-8"?>
<module name="analytics">
    <interests>
        <!--
          Any module defined with launcher category will
            be the starting component
          of the pipeline. In rare scenarios there can be
            multiple modules that needs
          to be started at the beginning
        -->
        <interest
          action="com.acn.rtaf.RealTimeAnalyticsFramework.framework.analytics"/>
        <!--<interest category="launcher"/>-->
    </interests>
    <launcher
      class="com.acn.rtaf.framework.analytics.RtafAnalyticEngine"/>
    <successors>
        <interest
          action="com.acn.rtaf.RealTimeAnalyticsFramework.framework.rule_engine_prediction"/>
        <!--
        <interest
          action="com.acn.rtaf.RealTimeAnalyticsFramework.framework.parser"/>
        <interest action="a"/>
        If the output of this module needs to be delivered to
          multiple
        modules specify them as successors here
        -->
    </successors>
</module>
```

Table 3 shows an example connector XML file that is referenced in the example prediction master configuration file of Table 1.

Table 3: Example Connector XML File

```
<?xml version="1.0" encoding="UTF-8"?>
<module>
  <interests>
    <!--
      Any module defined with launcher category will
        be the starting component
      of the pipeline. In rare scenarios there can be
        multiple modules that needs
      to be started at the beginning
    >
    <interest
      action="com.acn.rtaf.RealTimeAnalyticsFramework.framework.connector"/>
    <interest category="launcher"/>
  </interests>
  <launcher
    class="com.acn.rtaf.framework.connector.RTAFConnector"/>
  <successors>
    <interest
      action="com.acn.rtaf.RealTimeAnalyticsFramework.framework.validator" l>
    <!--
      If the output of this module needs to be delivered to
        multiple
      modules specify them as successors here
    >
  </successors>
</module>
```

Table 4 shows an example writeservice XML file that is referenced in the example prediction master configuration file of Table 1.

Table 4: Example Writeservice XML File

```
<?xml version="1.0" encoding="UTF-8"?>
<module>
  <interests>
    <!--
      Any module defined with launcher category will
        be the starting component
      of the pipeline. In rare scenarios there can be
        multiple modules that needs
      to be started at the beginning
    -->
    <interest
      action="com.acn.rtaf.RealTimeAnalyticsFramework.framework.writeservice.prediction_writeservice"/>
    <!--<interest category="launcher"/>-->
  </interests>
  <launcher
    class="com.acn.rtaf.framework.dataservices.RTAFPersistence"/>
  <successors>
    <!--<interest
      action="com.acn.rtaf.RealTimeAnalyticsFramework.framework.analytics"/>
    -->
      If the output of this module needs to be delivered to
        multiple
      modules specify them as successors here
    -->
  </successors>
</module>
```

Table 5 shows an example engine prediction XML file that is referenced in the example prediction master configuration file of Table 1.

Table 5: Example Engine Prediction XML File

```
<?xml version="1.0" encoding="UTF-8"?>
<module>
  <interests>
    <!--
      Any module defined with launcher category will
        be the starting component
      of the pipeline. In rare scenarios there can be
        multiple modules that needs
      to be started at the beginning
    -->
    <interest
      action="com.acn.rtaf.RealTimeAnalyticsFramework.framework.rule_engine_prediction"/>
  </interests>
  <launcher class="com.acn.rtaf.framework.rule.engine.manager.RTAFRuleEngine"/>
  <successors>
    <interest
      action="com.acn.rtaf.RealTimeAnalyticsFramework.framework.writeservice.prediction_writeservice"/>
    <!--
      If the output of this module needs to be delivered to
        multiple
      modules specify them as successors here
    -->
  </successors>
</module>
```

Table 6 shows an example validator prediction XML file that is referenced in the example prediction master configuration file of Table 1.

Table 6: Example Validator Prediction XML File

```
<?xml version="1.0" encoding="UTF-8"?>
<module>
  <interests>
    <!--
      Any module defined with launcher category will
        be the starting component
      of the pipeline. In rare scenarios there can be
        multiple modules that needs
      to be started at the beginning
    -->
    <interest
      action="com.acn.rtaf.RealTimeAnalyticsFramework.framework.validator"/>
    <!--<interest category="launcher"/>-->
  </interests>
  <launcher
    class="com.acn.rtaf.framework.validator.RTAFValidator"/>
  <successors>
    <interest
      action="com.acn.rtaf.RealTimeAnalyticsFramework.framework.analytics"/>
    <!--
```

If the output of this module needs to be delivered to
multiple
modules specify them as successors here
\>
</successors>
</module>

The second example configuration file set (Tables 7-10), may be used by the system to configure execution of data validations on raw data flows. The raw pipeline master configuration file shown in Table 7 may reference the raw connector (Table 8), raw writeservice (Table 9), and raw validator (Table 10) XML files.

Table 7 below shows an example raw pipeline master configuration file.

Table 7: Example Raw Pipeline Master Configuration File

```
<?xml version="1.0" encoding="UTF-8"?>
<!--
    This is the primary configuration file for RTAF pipeline.
    Purpose:
        1) Specify the building block/modules of the entire pipeline
        2) Specify the global configuration file holding configurable
           options for all the modules
    Date of creation:
        10th May, 2016
    version: 1.0
-->
<pipeline name="RtafPipeline">
    <configuration
        name="pipeline_config_raw.properties"
        arn="arn:aws:dynamodb:us-east-1:533296168095:
            table/RAW_CONFIGURATION"/>
    <module name="connector"
        config="connector.xml" config_location="s3"
        bucket_name="aip-rtaf-pipeline-modules/raw_pipeline"/>
    <module name="validator"
        config="validator_raw.xml" config_location="s3"
        bucket_name  "aip-rtaf-pipeline-modules/raw_pipeline"/>
    <module name="raw_data_writeservice"
        config="raw_data_writeservice.xml"
        config_location="s3"
        bucket_name  "aip-rtaf-pipeline-modules/raw_pipeline" I>
</pipeline>
```

Table 8 shows an example raw connector XML file that is referenced in the example raw pipeline master configuration file of Table 7.

Table 8: Example Raw Connector XML File

```
<?xml version="1.0" encoding="UTF-8"?>
<module>
    <interests>
        <!--
            Any module defined with launcher category will
                be the starting component
            of the pipeline. In rare scenarios there can be
                multiple modules that needs
            to be started at the beginning
        -->
        <interest
            action="com.acn.rtaf.RealTimeAnalyticsFramework.framework.connector"/>
        <interest category="launcher"/>
    </interests>
    <launcher
        class="com.acn.rtaf.framework.connector.RTAFConnector"/>
    <successors>
        <interest
            action="com.acn.rtaf.RealTimeAnalyticsFramework.framework.validator"/>
        <!--
            If the output of this module needs to be delivered to
                multiple
            modules specify them as successors here
        -->
    </successors>
</module>
```

Table 9 shows an example raw writeservice XML file that is referenced in the example raw pipeline master configuration file of Table 7.

Table 9: Example Raw Writeservice XML File

```
<?xml version="1.0" encoding="UTF-8"?>
<module>
    <interests>
        <!--
            Any module defined with launcher category will
                be the starting component
            of the pipeline. In rare scenarios there can be
                multiple modules that needs
            to be started at the beginning
        -->
        <interest
            action="com.acn.rtaf.RealTimeAnalyticsFramework.framework.writeservice.raw_data_writeservice"/>
        <!--<interest category="launcher"/>--></interests>
    <launcher
        class="com.acn.rtaf.framework.dataservices.RTAFPersistence"/>
    <successors>
        <!--<interest
            action="com.acn.rtaf.RealTimeAnalyticsFramework.framework.analytics"/>-->
        <!--
            If the output of this module needs to be delivered to
                multiple
            modules specify them as successors here
        -->
    </successors>
</module>
```

Table 10 shows an example raw validator XML file that is referenced in the example raw pipeline master configuration file of Table 7.

Table 10: Example Raw Validator XML File

```
<?xml version="1.0" encoding="UTF-8"?>
<module>
    <interests>
        <!--
            Any module defined with launcher category will
                be the starting component
```

```
            of the pipeline. In rare scenarios there can be
                multiple modules that needs
                to be started at the beginning
        -->
        <interest
            action="com.acn.rtaf.RealTimeAnalyticsFrame
            work.framework.validator"/>
        <!--<interest category="launcher"/>-->
    </interests>
    <launcher
class="com.acn.rtaf.framework.validator.RTAF
    Validator"/>
    <successors>
        <!--<interest
            action="com.acn.rtaf.RealTimeAnalyticsFrame
            work.framework.rule_engine_raw"/>-->
        <!--<interest
            action="com.acn.rtaf.RealTimeAnalyticsFrame
            work.framewor k.writeservice.raw_data_writeser-
            vice"/>-->
        <interest
            action="com.acn.rtaf.RealTimeAnalyticsFrame
            work.framewor k.writeservice.raw_data_writeser-
            vice" I>
        <!--
        If the output of this module needs to be delivered to
            multiple
        modules specify them as successors here
        -->
    </successors>
</module>
```

Analytics Processing Stack

Figure 13:
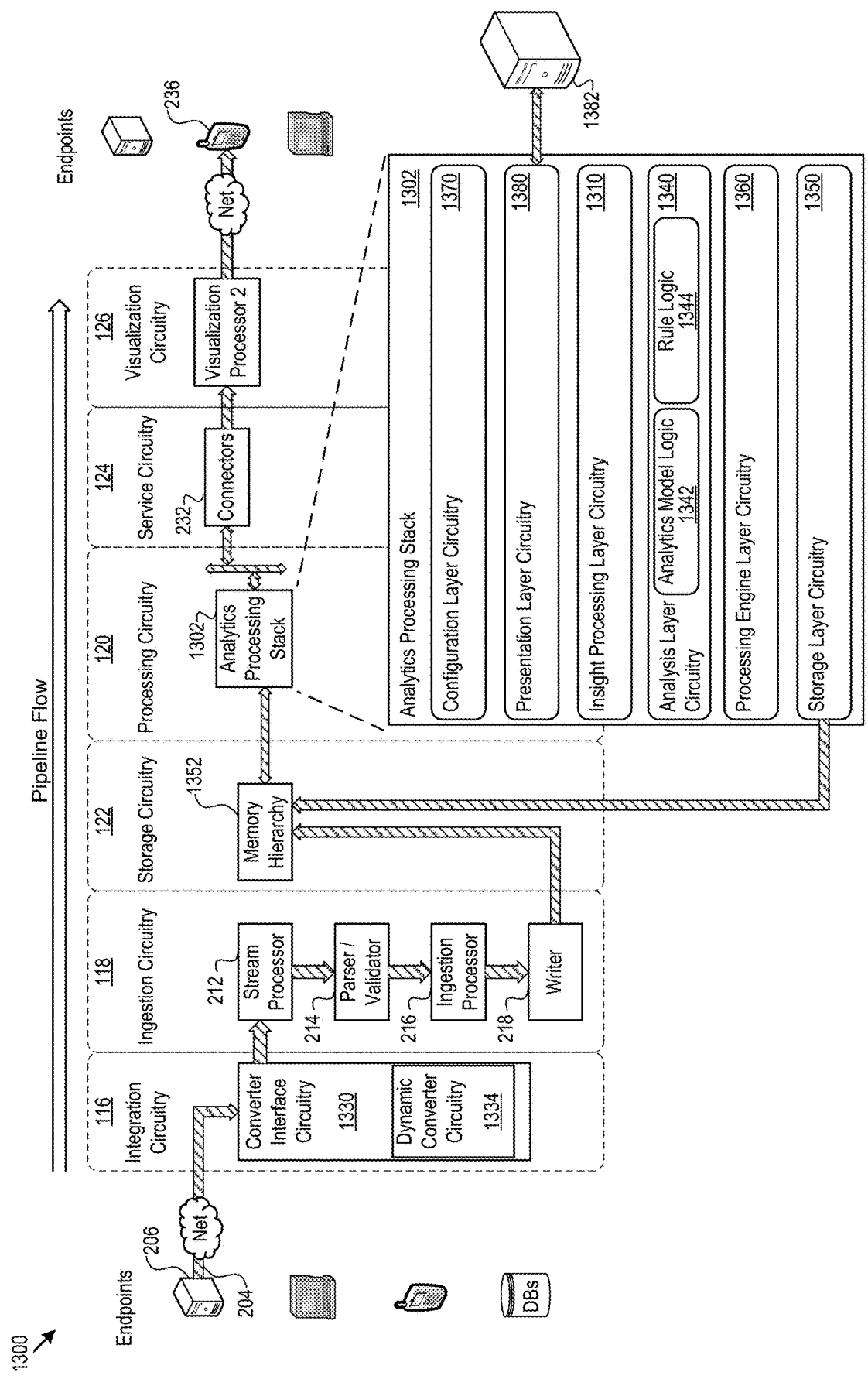
FIG. 13 shows an example data pipeline architecture including an analytics processing stack.

In various implementations, the DPAs (e.g., 200, 300, 500, 700, 1100, 1200) described above may include an analytics processing stack 1302 implemented, e.g., within the processing circuitry 120. FIG. 13 shows an example DPA 1300 including an analytics processing stack 1302. The analytics processing stack 1302 may implement any of a wide variety of analysis on incoming data. For instance, the analytics processing stack 1302 may be configured to detect patterns within the data to extract and refine predictive models and rules for data handling and response generation. The analytics processing stack 1302 may include insight processing layer circuitry 1310, analysis layer circuitry 1340, storage layer circuitry 1350, processing engine layer circuitry 1360, configuration layer circuitry 1370, and presentation layer circuitry 1380.

The insight processing layer circuitry 1310 may analyze the data, models, and rules stored within the memory hierarchy 1352 to determine multi-stack-layer patterns based on a wealth of data and stack output that may not necessarily be available to the analysis layer circuitry 1340.

The DPA 1300 may further include converter interface circuitry 1330 which may supplant, complement, or incorporate the connectors within the integration circuitry 116 discussed above. The dynamic converter circuitry 1334 may ensure that the analytics processing stack 1302 receives data from the varied data endpoints of the DPA in a unified or consistent format. For example, audio/visual (NV) data may be analyzed using natural language processing (NLP), computer vision (CV), or other analysis packages. Accordingly, the converter interface circuitry may place the NV data in a data format consistent with other input data streams, such as PMML, PFA, text, or other data streams. The unified or consistent data format may include CSV, JSON, XML, YAML, or other machine-cognizable data formats.

The analytics processing stack 1302 solves the technical and structural problem of parallel analytics-rule output coupling by passing the output of rule logic 1344 and analytics model logic 1342 at the analysis layer circuitry 1340 of the analytics processing stack 1302 to the insight processing layer circuitry 1310 for rule and analytics analysis. This consideration of parallel output may increase rule efficacy and analytics model accuracy. As a result, the architectural and technical features of the analytics processing stack 1302 improve functioning the underlying hardware and improve upon existing solutions.

In addition, performing analytics on data streams of with inconsistent or varied input formats may increase the processing hardware resource consumption of a system compared to a system performing analytics on unified or consistent data formats. However, to support a DPA that accepts various input streams from different data endpoints, a system may support data input in varied formats. The converter interface circuitry solves the technical problems of inconsistent or disunified data formats by converting disparate input data formats into unified or consistent formats. Accordingly, the processing hardware resource consumption of the analytics processing stack is reduced by the converter interface circuitry. Accordingly, the converter interface circuitry improves hardware functioning improves upon existing solutions.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the analytics processing stack 1302, the storage layer circuitry 1350 may provide the insight processing layer circuitry 1310 with access to a memory resource, such as memory access to data stream incoming via a network interface. Hence, the storage layer circuitry 1350 may provide a hardware resource, e.g., memory access, to the insight processing layer circuitry 1310.

Figure 14:
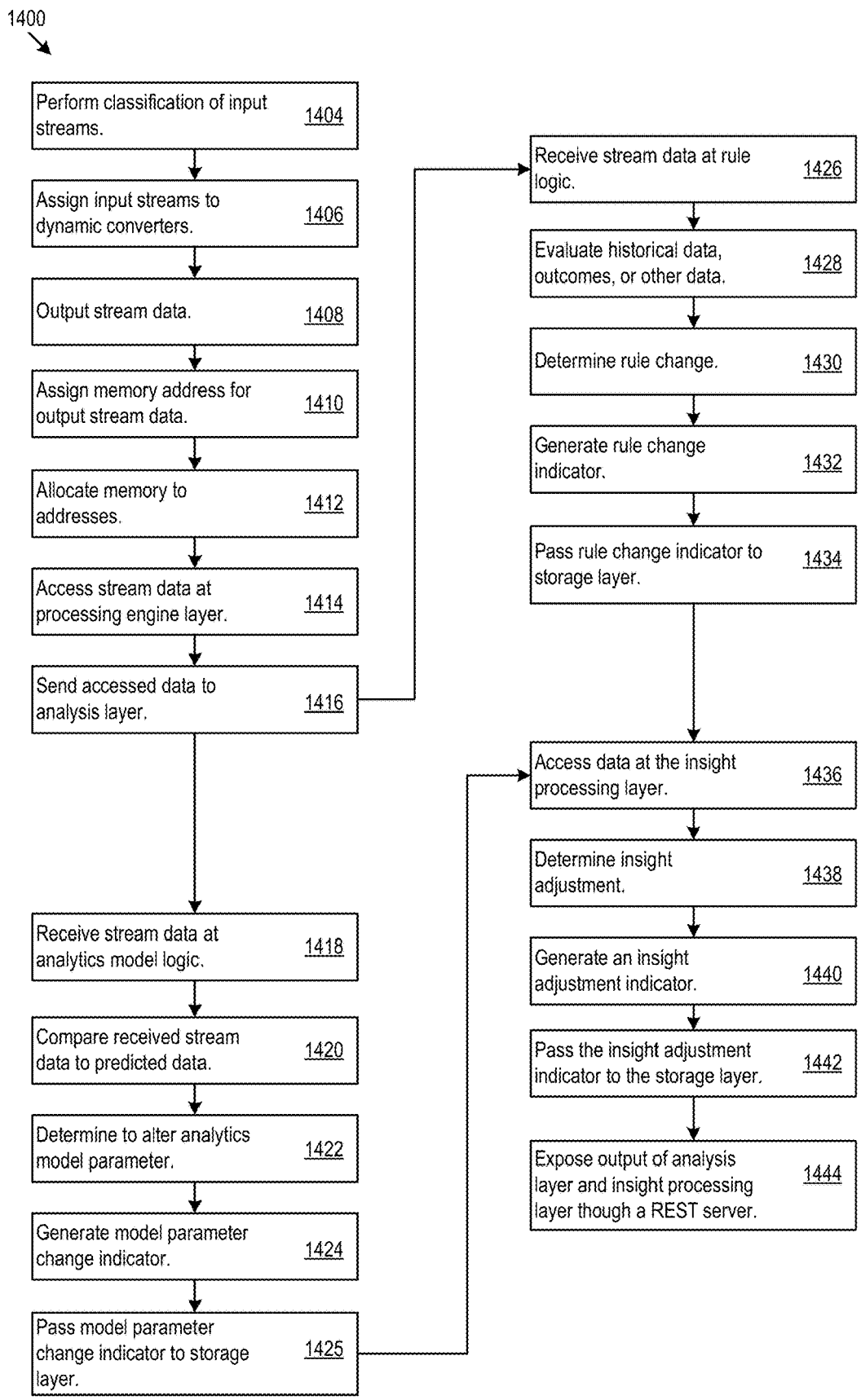
FIG. 14 shows analytics processing stack logic corresponding to the example data pipeline architecture of FIG. 13.

Referring now to the DPA 1300 FIG. 13 and the corresponding analytics processing stack logic (APSL) 1400 of FIG. 14, the operation of the DPA is described below. Although the analytics processing stack 1302 is shown within an example implementation of the DPA 1300, other DPA implementations may similarly integrate the analytics processing stack 1302 within the processing circuitry 120. The logical features of APSL 1400 may be implemented in various orders and combinations. For example, in a first implementation, one or more features may be omitted or reordered with respect to a second implementation.

The converter interface circuitry 1330 may be disposed within the integration circuitry 116 of the DPA 1300. The converter interface circuitry 1330 may perform a classification on the input streams (1404). The classification may include determining an input stream type for multiple input streams received from multiple endpoints. The input stream types may include, structured data streams, natural language data streams, media streams, or other input stream types.

Structured data streams may include structured data such as sensor data, CSV format streams, PMML format streams, PFA format streams, columnar data streams, tab separated data, or other structured data streams. Structured data streams may be readily processed by the analytics processing stack 1302. Accordingly, the APSL 1400 may determine to perform format conversions but not necessarily rely on substantive analyses (e.g., by the converter interface circuitry) to extract usable data from the structured data stream.

Natural language data streams may include data streams with natural language content, for example, letters, news articles, periodicals, white papers, transcribed audio, metadata comments, social media feeds, or other streams incorporating natural language content. Natural language data stream may not necessarily be readily processed by the analytics processing stack without substantive analysis for extraction of content from the natural language form. Accordingly, natural language data streams may be classified separately from structured data streams so that the natural language content may be analyzed using natural language tools, such as OpenNLP or other tool sets.

Media streams may include audio and/or visual (NV) content. Media content may be transcribed or processed through a machine vision system to extract data. For example, voice recognition systems may be used to transcribe recorded audio. In some cases, the APSL 1400 may apply machine vision tools such as OpenCV to extract data from the video content.

Once, the input streams are classified, the converter interface circuitry may assign the input streams to dynamic converters 1334 responsive to the assignment (1406). The dynamic converters 1334 may be specifically configured to handle the different classification types. For example, a structured data dynamic converter may include tools to support reformatting to support generation of output in a unified or consistent data format. Similarly, a natural language dynamic converter may include natural language processing tools, while a media dynamic converter may include a combination of voice recognition, speech-to-text processing, machine vision, and natural language processing tools. The dynamic converters 1334 may output stream data (1408).

The output of the converter interface circuitry may include data in a unified or consistent format regardless of the type or format of the data incoming on the input streams. In some implementations, the unified or consistent format may include a pre-defined interchange format. A user may select the pre-defined interchange format to be a format supported both by the converter interface circuitry and the analytics processing stack 1302. Accordingly, the system data may "interchange" between the analytics processing stack 1302 and the ingestion stage of the DPA using this format. In some cases, the data interchange format may include one or more of CSV format, JSON format, XML format, YAML format, or other data formats supporting system interoperability.

Once the input streams have been reformatted and analyzed by the dynamic converters, the storage layer circuitry 1350 may assign memory addresses for the output from the input streams (1410). The storage layer circuitry 1350 may further allocate memory to the assigned addresses to store/buffer the stream data in the interchange format (1412).

The storage layer circuitry 1350 may provide hardware resource memory access to a memory hierarchy 1352 for the analytics processing stack 1302. The memory hierarchy 1352 may provide different hierarchy levels for the various layers of the analytics processing stack 1302. Accordingly, different preferences may be set (e.g., using the configuration layer circuitry 1370) for memory storage within the hierarchy 1352. These preferences may include the memory paradigm for storage. For example, one layer may be provided relational database memory access while another layer is provided localized hard disk storage. In some implementations, the storage layer circuitry 1350 may abstract memory hardware resources for the other layers based on configuration preferences. According storage preferences may be enforced by the storage layer circuitry 1350 based on activity and/or requesting layer while other layers request generalized memory operations, which may be storage paradigm agnostic.

The processing engine layer circuitry 1360 of the analytics processing stack 1302 may access stream data via the storage layer circuitry 1350 (1414). The processing engine layer circuitry may determine whether to send the accessed data to the analytics model logic 1342 of the analysis layer circuitry 1340, the rule logic 1344 of the analysis layer circuitry 1340, or both (1416). The processing engine layer circuitry 1360 may operate as an initial sorting system for determine whether incoming data will be applied to predictive modelling via the analytics model logic 1342 or be used by the rule logic to refine data-based heuristics. The processing engine layer circuitry may base the determination on data content, scheduling, distribution rules, or in may provide data to both the analytics model logic 1342 and the rule logic 1344. Accordingly, the APSL 1400 may proceed to either analysis by the analytics model logic 1342 (1418-1424) or analysis by the rule logic 1344 (1426-1434) after the data is accessed and sorted.

The analytics model logic 1342 may receive stream data from the processing engine layer circuitry 1360 (1418). The analytics model logic 1342 may control predictive models that analyze the stream data for patterns. The analytics model logic 1342 may compare the received stream data to predicted data from a predictive model controlled by the analytics model logic 1342 (1420). Responsive to the comparison, the analytics model logic 1342 may determine to alter a model parameter for the predictive model (1422). For example, the analytics model logic 1342 may determine to alter the type of predictive model used, the seasonality of the predictive model, the state parameters of the predictive model, the periodicity predictions for the model, the precision of the model, or other model parameters.

Once the analytics model logic determines the change to the model parameter, the analytics model logic 1342 may generate a model change indicator that indicates the change to the model parameter (1424). The analytic model logic 1342 may pass the model change indicator to the storage layer circuitry 1350 for storage within the memory hierarchy (1425).

The rule logic 1344 may receive stream data from the processing engine layer circuitry 1360 (1426). The rule logic 1344 may control rules for handling data and responding to data patterns or events. The rule logic 1344 may evaluate historical data, user interventions, outcomes or other data (1428). Responsive to the evaluation, the rule logic 1344 may determine a rule change for one or more rules governed by the rule logic 1344 (1430). For example, rule logic 1344 may determine an adjustment to a conditional response, an adjustment to triggers for response, an adjustment in magnitude or nature of response, addition of a rule, removal of a rule, or other rule change.

Once the rule logic 1344 determines the change to the one or more rules, the rule logic 1344 may generate a rule change indicator that indicates the change to the rules (1432). The rule logic 1344 may pass the rule change indicator to the storage layer circuitry 1350 for storage within the memory hierarchy (1434).

The insight processing layer circuitry 1310 may access stream data, analytics models, analytics model parameters, rules, rule parameters, change indicators, or any combination thereof through the storage layer circuitry 1350 (1436).

By processing data at the insight processing layer circuitry 1310 above the analysis layer circuitry 1340 in the analytics processing stack, the insight processing layer circuitry 1310 may have access to the rules, analytics model parameters, and change indicators generated by the analysis layer circuitry 1340. The breadth of access to information resulting, at least in part, from the structural positioning (e.g., within the logical hardware and software context of the analytics processing stack) of the insight processing layer circuitry relative to the analysis layer circuitry allows the insight processing layer circuitry 1310 to make changes and adjustments to rules and model parameters while taking into account both the output of the rule logic 1344 and the analytics model logic 1342.

The insight processing layer circuitry 1310 may determine an insight adjustment responsive to accessed analytics model parameters, rules, rule parameters, change indicators, or any combination thereof (1438). The insight adjustment may include an addition, removal, and/or adjustment to the analytics model parameters, rules, rule parameters, or any combination thereof. Alternatively or additionally, the insight processing layer circuitry may directly remove or edit the change indicators generated by the analysis layer circuitry 1340. Once the insight adjustment is determined, the insight processing layer circuitry 1310 may generate an insight adjustment indicator (1440) that reflects the determine adjustment. The insight processing layer circuitry 1310 may pass the insight adjustment indicator to the storage layer circuitry for storage within the memory hierarchy (1442).

The configuration layer circuitry 1370 may include an application programming interface (API) 1372 that may provide configuration access to the model logic 1342, the rule logic 1344, the insight processing layer circuitry 1310, or any combination thereof. The API may allow for parallel and/or automated control and configuration of multiple instances of analytics models, rules, rule logic 1344, and analytics model logic 1342. In some implementations, an operator may use a software development kit (SDK) to generate a scripted configuration file for the API. A scripted configuration file may include a collection of preferences for one or more different configuration settings for one or more parallel instances. Accordingly, an operator may control up to hundreds of parallel analytics models and rule systems or more.

The presentation layer circuitry 1380 may allow for monitoring and/or control (e.g., local or remote) of the analytics processing stack 1302. In some implementations, the presentation layer circuitry may access the hierarchical memory via the storage layer circuitry 1350 and expose the output of the insight processing layer circuitry 1310 and the analysis layer circuitry 1340 through a representational state transfer (REST) server 1382 (1444).

Figure 15:
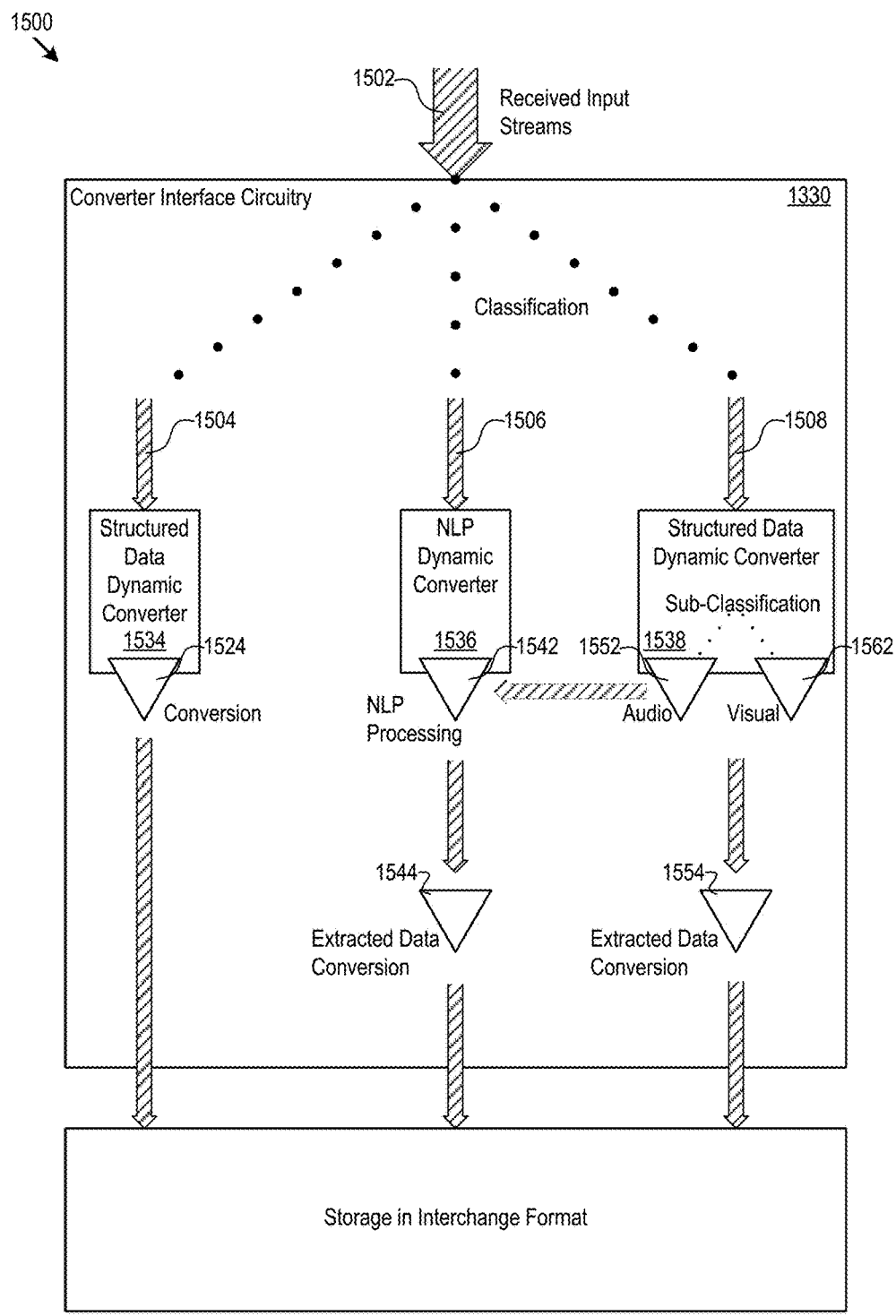
FIG. 15 shows logical operational flow for converter interface circuitry.

Now referring to FIG. 15, logical operational flow 1500 for the converter interface circuitry 1330 is shown. As discussed above, the dynamic converters 1334 may be used by the converter interface circuitry 1330 to handle intake, processing and conversion of stream data at the integration stage of the DPA 1300. The converter interface circuitry 1330 may receive stream data from the endpoints (1502). The converter interface circuitry 1330 may classify the stream data into structured data streams 1504, natural language data streams 1506, and media data streams 1508. The structured data dynamic converter 1534 may convert (1524) the structured data stream to the interchange format.

The natural language dynamic converter 1536 may apply natural language processing 1542 to extract structured data from the natural language data stream. The extracted structured data may be generated in or converted to (1544) the interchange format by the natural language dynamic converter 1536.

The media dynamic converter 1538 may receive media data streams 1508. The media dynamic converter may perform a sub-classification on the media data streams to separate audio from visual media. The media dynamic converter 1538 may extract natural language (or in some cases structured data) from the audio media using audio processing 1552, such as speech-to-text, voice recognition, tonal-recognition, demodulation or other audio processing. When natural language data is extracted from the audio media, the media dynamic converter may pass the natural language data to the natural language dynamic converter 1536 for processing, in some cases. In other cases, the media dynamic converter 1538 may apply natural language processing without passing the extracted natural language data. The output from the audio processing 1552 and/or additional natural language processing may be converted to (1554) the interchange format by the media dynamic converter 1538.

The media dynamic converter 1538 may apply computer vision (CV) processing 1562, such as machine vision, ranging, optical character recognition, facial recognition, biometric identification, or other computer vision processing. The output from the computer vision processing may be converted to (1554) the interchange format by the media dynamic converter 1538.

P121 Various implementations may use the techniques and architectures described above. In an example, a system comprises: a data stream processing pipeline comprising sequential multiple input processing stages, including: an ingestion stage comprising multiple ingestion processors configured to receive input streams from multiple different input sources; an integration stage comprising converter interface circuitry configured to: perform a classification on the input streams; and responsive to the classification, assign the input streams to one or more dynamic converters of the converter interface circuitry configured to output data from multiple different stream types into a stream data in a pre-defined interchange format; and a storage stage comprising a memory hierarchy, the memory hierarchy configured to store stream data in the pre-defined interchange format; and an analytics processing stack coupled to the data stream processing pipeline, the analytics processing stack configured to: access the stream data, via a hardware memory resource provided by storage layer circuitry of the analytics processing stack; process the stream data at processing engine layer circuitry of the analytics processing stack to determine whether to provide the stream data to analytics model logic of analysis layer circuitry of the analytic processing stack, rule logic of the analysis layer circuitry of the analytic processing stack, or both; when the stream data is passed to the analytics model logic: determine a model change to a model parameter for a predictive data model for the stream data; and pass a model change indicator of the model change to the storage layer circuitry for storage within the memory hierarchy; when the stream data is passed to the rule logic: determine a rule change for a rule governing response to content of the stream data; and pass a rule change indicator of the rule change to the storage layer circuitry for storage within the memory hierarchy; at insight processing layer circuitry above the analysis layer circuitry within the analytics processing stack: access the model change indicator, the rule change indicator, the stream data, or any combination thereof via the hardware memory resource provided by the storage layer circuitry; determine an insight adjustment responsive to the model change, the rule change, the stream data, or any combination thereof; generate an insight adjustment indicator responsive to the insight adjustment; and pass the insight adjustment indicator to the storage layer circuitry for storage within the memory hierarchy.

P122 The example of reference P121, where the dynamic converters comprise: a structured data dynamic converter configured to handle input streams in a predetermined predictor data format; a natural language dynamic converter configured to handle natural language input streams; and a media dynamic converter configured to handle media input streams.

P123 The example of reference P122, where the media dynamic converter is configured to select among speech-to-text processing for audio streams and computer vision processing for video streams.

P124 The example of either of references P122 or P123, where the predetermined predictor data format comprises a predictive model markup language (PMML) format, a portable format for Analytics (PFA), or both.

P125 The example of any of references P121-P124, where the analytics processing stack further includes configuration layer circuitry configured to accept a configuration input.

P126 The example of any of references P121-P125, where the configuration input is implemented via an application programming interface (API) configured to provide access to the analytics model logic, the rule logic, the insight processing layer circuitry, or any combination thereof.

P127 The example of reference P126, where the API is configured to support parallel management of multiple instances of the analytics model logic, the rule logic, or both.

P128 The example of either of references P126 or P127, where the API is configured to accept a scripted configuration file comprising a configuration setting for the analytics model logic, the rule logic, the insight processing layer circuitry, or any combination thereof.

P129 The example of any of references P121-P128, where the analytics processing stack further comprises presentation layer circuitry configured to expose the model change indicator, the rule change indicator, the insight adjustment indicator, or any combination thereof to a representational state transfer (REST) server.

P130 The example of any of references P121-P129, where: the analytic processing stack further includes presentation layer circuitry; and the insight processing layer circuitry is further configured to: generate a notification responsive to the insight adjustment indicator; and send the notification to the presentation layer circuitry to indicate status for the model parameter, the rule, or both.

P131 In another example, a method comprises: in a data stream processing pipeline comprising sequential multiple input processing stages: receiving, at an ingestion stage of a data stream processing pipeline, input streams from multiple different input sources, the ingestion stage comprising multiple ingestion processors; at an integration stage comprising converter interface circuitry: performing a classification on the input streams; and responsive to the classification, assigning the input streams to one or more dynamic converters configured to output data from multiple different stream types into a stream data in a pre-defined interchange format; and at a storage stage comprising a memory hierarchy, storing stream data in the pre-defined interchange format; and in an analytics processing stack coupled to the data stream processing pipeline: accessing the stream data, via a hardware memory resource provided by storage layer circuitry of the analytics processing stack; processing the stream data at processing engine layer circuitry of the analytics processing stack to determine whether to provide the stream data to analytics model logic of analysis layer circuitry of the analytic processing stack, rule logic of the analysis layer circuitry of the analytic processing stack, or both; when the stream data is passed to the analytics model logic: determining a model change to a model parameter for a predictive data model for the stream data; and passing a model change indicator of the model change to the storage layer circuitry for storage within the memory hierarchy; when the stream data is passed to the rule logic: determining a rule change for a rule governing response to content of the stream data; and passing a rule change indicator of the rule change to the storage layer circuitry for storage within the memory hierarchy; at insight processing layer circuitry above the analysis layer circuitry within the analytics processing stack: accessing the model change indicator, the rule change indicator, the stream data, or any combination thereof via the hardware memory resource provided by the storage layer circuitry; determining an insight adjustment responsive to the model change, the rule change, the stream data, or any combination thereof; generating an insight adjustment indicator responsive to the insight adjustment; and passing the insight adjustment indicator to the storage layer circuitry for storage within the memory hierarchy.

P132 The example of reference P131, where assigning the input streams to the one or more dynamic converters comprises: assigning a textual input stream to a textual dynamic converter configured to handle input streams in a predetermined predictor data format; assigning a textual input stream to a natural language dynamic converter configured to handle natural language input streams; assigning a media input stream to an audio/visual dynamic converter; or any combination thereof.

P133 The example of reference P132, where assigning a media input stream to the audio/visual dynamic converter comprises selecting among speech-to-text processing for audio streams and computer vision processing for video streams.

P134 The example of any of references P131-P133, where the predetermined predictor data format comprises a predictive model markup language (PMML) format, a portable format for Analytics (PFA), or both.

P135 The example of any of references P131-P134, further comprising exposing, at presentation layer circuitry of the analytics processing stack, the model change indicator, the rule change indicator, the insight adjustment indicator, or any combination thereof to a representational state transfer (REST) server.

P136 The example of any of references P131-P135, where the method further comprises: at the insight processing layer circuitry: generating a notification responsive to the insight adjustment indicator; and sending the notification to presentation layer circuitry of the analytics processing stack to indicate status for the model parameter, the rule, or both.

P137 In another example, a product comprises: a machine readable medium other than a transitory signal; and instructions stored on the machine readable medium, the instructions configured to, when executed, cause a processor to: in a data stream processing pipeline comprising sequential multiple input processing stages: receive, at an ingestion stage of a data stream processing pipeline, input streams from multiple different input sources, the ingestion stage comprising multiple ingestion processors; at an integration stage comprising converter interface circuitry: perform a classification on the input streams; and responsive to the classification, assign the input streams to one or more dynamic converters configured to output data from multiple different stream types into a stream data in a pre-defined interchange format; and at a storage stage comprising a memory hierarchy, store stream data in the pre-defined interchange format; and in an analytics processing stack coupled to the data stream processing pipeline: access the stream data, via a hardware memory resource provided by storage layer circuitry of the analytics processing stack; process the stream data at processing engine layer circuitry of the analytics process stack to determine whether to provide the stream data to analytics model logic of analysis layer circuitry of the analytic processing stack, rule logic of the analysis layer circuitry of the analytic processing stack, or both; when the stream data is passed to the analytics model logic: determine a model change to a model parameter for a predictive data model for the stream data; and pass a model change indicator of the model change to the storage layer circuitry for storage within the memory hierarchy; when the stream data is passed to the rule logic: determine a rule change for a rule governing response to content of the stream data; and pass a rule change indicator of the rule change to the storage layer circuitry for storage within the memory hierarchy; at insight processing layer circuitry above the analysis layer circuitry within the analytics processing stack: access the model change indicator, the rule change indicator, the stream data, or any combination thereof via the hardware memory resource provided by the storage layer circuitry; determine an insight adjustment responsive to the model change, the rule change, the stream data, or any combination thereof; generate an insight adjustment indicator responsive to the insight adjustment; and pass the insight adjustment indicator to the storage layer circuitry for storage within the memory hierarchy.

P138 The example of reference P137, where the instructions are further configured to cause the processor to expose, at presentation layer circuitry of the analytics processing stack, the model change indicator, the rule change indicator, the insight adjustment indicator, or any combination thereof to a representational state transfer (REST) server.

P139 The example of either of references P137 or P138, where the instructions are further configured to cause the processor to: at the insight processing layer circuitry: generate a notification responsive to the insight adjustment indicator; and send the notification to presentation layer circuitry of the analytics processing stack to indicate status for the model parameter, the rule, or both.

P140 The example of any of references P137-P139, where the instructions are further configured to cause the processor to accept, configuration layer circuitry of the analytics processing stack, a configuration input implemented via an application programming interface (API) configured to provide access to the analytics model logic, the rule logic, the insight processing layer circuitry, or any combination thereof.

The methods, devices, processing, circuitry (e.g., insight processing layer circuitry, analysis layer circuitry, storage layer circuitry, processing engine layer circuitry, presentation layer circuitry, configuration layer circuitry, or other circuitry), and logic (e.g., APSL, rule logic, analytics model logic, or other logic) described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways.

Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible. Any feature or features from one embodiment may be used with any feature or combination of features from another.

The invention claimed is:

1. A system comprising:
   a data stream processing pipeline comprising sequential multiple input processing stages, including:
   an ingestion stage comprising multiple ingestion processors configured to receive input streams from multiple different input sources;
   an integration stage comprising converter interface circuitry configured to:
   perform a classification on the input streams; and responsive to the classification, assign the input streams to one or more dynamic converters of the converter interface circuitry configured to output data from multiple different stream types into a stream data in a predefined interchange format, the one or more dynamic converters comprising:
a structured data dynamic converter configured to handle input streams in a predetermined predictor data format;
a natural language dynamic converter configured to handle natural language input streams; and
a media dynamic converter configured to handle media input stream by:
selecting among speech-to-text processing for audio streams and computer vision processing for video streams; and
causing execution of selected processing for the media input streams, when present, to generate the output data; and
a storage stage comprising a memory hierarchy, the memory hierarchy configured to store the stream data in the pre-defined interchange format; and an analytics processing stack coupled to the data stream processing pipeline, the analytics processing stack configured to:
access the stream data, via a hardware memory resource provided by storage layer circuitry of the analytics processing stack;
process the stream data at processing engine layer circuitry of the analytics processing stack to determine whether to provide the stream data to analytics model logic of analysis layer circuitry of the analytic processing stack, rule logic of the analysis layer circuitry of the analytic processing stack, or both;
when the stream data is passed to the analytics model logic:
determine a model change to a model parameter for a predictive data model for the stream data; and
pass a model change indicator of the model change to the storage layer circuitry for storage within the memory hierarchy;
when the stream data is passed to the rule logic:
determine a rule change for a rule governing response to content of the stream data; and
pass a rule change indicator of the rule change to the storage layer circuitry for storage within the memory hierarchy;
at insight processing layer circuitry above the analysis layer circuitry within the analytics processing stack:
access the model change indicator, the rule change indicator, the stream data, or any combination thereof via the hardware memory resource provided by the storage layer circuitry;
determine an insight adjustment responsive to the model change, the rule change, the stream data, or any combination thereof;
generate an insight adjustment indicator responsive to the insight adjustment; and
pass the insight adjustment indicator to the storage layer circuitry for storage within the memory hierarchy.

2. The system of claim 1, where the predetermined predictor data format comprises a predictive model markup language (PMML) format, a portable format for Analytics (PFA), or both.

3. The system of claim 1, where the analytics processing stack further includes configuration layer circuitry configured to accept a configuration input.

4. The system of claim 3, where the configuration input is implemented via an application programming interface (API) configured to provide access to the analytics model logic, the rule logic, the insight processing layer circuitry, or any combination thereof.

5. The system of claim 4, where the API is configured to support parallel management of multiple instances of the analytics model logic, the rule logic, or both.

6. The system of claim 4, where the API is configured to accept a scripted configuration file comprising a configuration setting for the analytics model logic, the rule logic, the insight processing layer circuitry, or any combination thereof.

7. The system of claim 1, where the analytics processing stack further comprises presentation layer circuitry configured to expose the model change indicator, the rule change indicator, the insight adjustment indicator, or any combination thereof to a representational state transfer (REST) server.

8. The system of claim 1, where:
the analytic processing stack further includes presentation layer circuitry; and the insight processing layer circuitry is further configured to:
generate a notification responsive to the insight adjustment indicator; and send the notification to the presentation layer circuitry to indicate status for the model parameter, the rule, or both.

9. A method comprising:
in a data stream processing pipeline comprising sequential multiple input processing stages:
receiving, at an ingestion stage of a data stream processing pipeline, input streams from multiple different input sources, the ingestion stage comprising multiple ingestion processors;
at an integration stage comprising converter interface circuitry:
performing a classification on the input streams; and responsive to the classification, assigning the input streams to one or more dynamic converters configured to output data from multiple different stream types into a stream data in a pre-defined interchange format, the one or more dynamic converters comprising:
a structured data dynamic converter configured to handle input streams in a predetermined predictor data format;
a natural language dynamic converter configured to handle natural language input streams; and
a media dynamic converter configured to handle media input stream by:
selecting among speech-to-text processing for audio streams and computer vision processing for video streams; and
causing execution of selected processing for the media input streams, when present, to generate the output data: and at a storage stage comprising a memory hierarchy, storing the stream data in the pre-defined interchange format; and
in an analytics processing stack coupled to the data stream processing pipeline:
accessing the stream data, via a hardware memory resource provided by storage layer circuitry of the analytics processing stack;
processing the stream data at processing engine layer circuitry of the analytics processing stack to determine whether to provide the stream data to analytics model logic of analysis layer circuitry of the analytic processing stack, rule logic of the analysis layer circuitry of the analytic processing stack, or both;
when the stream data is passed to the analytics model logic:
determining a model change to a model parameter for a predictive data model for the stream data; and passing a model change indicator of the model change to the storage layer circuitry for storage within the memory hierarchy;
when the stream data is passed to the rule logic:
determining a rule change for a rule governing response to content of the stream data; and
passing a rule change indicator of the rule change to the storage layer circuitry for storage within the memory hierarchy;
at insight processing layer circuitry above the analysis layer circuitry within the analytics processing stack:
accessing the model change indicator, the rule change indicator, the stream data, or any combination thereof via the hardware memory resource provided by the storage layer circuitry; determining an insight adjustment responsive to the model change, the rule change, the stream data, or any combination thereof;
generating an insight adjustment indicator responsive to the insight adjustment; and
passing the insight adjustment indicator to the storage layer circuitry for storage within the memory hierarchy.

10. The method of claim 9, further comprising accepting, at configuration layer circuitry of the analytics processing stack, a configuration input implemented via an application programming interface (API) configured to provide access to the analytics model logic, the rule logic, the insight processing layer circuitry, or any combination thereof.

11. The method of claim 9, where the predetermined predictor data format comprises a predictive model markup language (PMML) format, a portable format for Analytics (PFA), or both.

12. The method of claim 9, further comprising exposing, at presentation layer circuitry of the analytics processing stack, the model change indicator, the rule change indicator, the insight adjustment indicator, or any combination thereof to a representational state transfer (REST) server.

13. The method of claim 9, where the method further comprises: at the insight processing layer circuitry:
generating a notification responsive to the insight adjustment indicator; and
sending the notification to presentation layer circuitry of the analytics processing stack to indicate status for the model parameter, the rule, or both.

14. A product comprising:
a machine readable medium other than a transitory signal; and
instructions stored on the machine readable medium, the instructions configured to, when executed, cause a processor to:
in a data stream processing pipeline comprising sequential multiple input processing stages:
receive, at an ingestion stage of a data stream processing pipeline, input streams from multiple different input sources, the ingestion stage comprising multiple ingestion processors;
at an integration stage comprising converter interface circuitry:
perform a classification on the input streams; and responsive to the classification, assign the input streams to one or more dynamic converters configured to output data from multiple different stream types into a stream data in a pre-defined interchange format, the one or more dynamic converters comprising:
a structured data dynamic converter configured to handle input streams in a predetermined predictor data format:
a natural language dynamic converter configured to handle natural language input streams: and
a media dynamic converter configured to handle media input streams by:
selecting among speech-to-text processing for audio streams and computer vision processing for video streams; and
causing execution of selected processing for the media input streams, when present, to generate the output data; and at a storage stage comprising a memory hierarchy, store the stream data in the pre-defined interchange format; and
in an analytics processing stack coupled to the data stream processing pipeline: access the stream data, via a hardware memory resource provided by storage layer circuitry of the analytics processing stack;
process the stream data at processing engine layer circuitry of the analytics process stack to determine whether to provide the stream data to analytics model logic of analysis layer circuitry of the analytic processing stack, rule logic of the analysis layer circuitry of the analytic processing stack, or both;
when the stream data is passed to the analytics model logic:
determine a model change to a model parameter for a predictive data model for the stream data; and
pass a model change indicator of the model change to the storage layer circuitry for storage within the memory hierarchy;
when the stream data is passed to the rule logic:
determine a rule change for a rule governing response to content of the stream data; and
pass a rule change indicator of the rule change to the storage layer circuitry for storage within the memory hierarchy;
at insight processing layer circuitry above the analysis layer circuitry within the analytics processing stack:
access the model change indicator, the rule change indicator, the stream data, or any combination thereof via the hardware memory resource provided by the storage layer circuitry;
determine an insight adjustment responsive to the model change, the rule change, the stream data, or any combination thereof;
generate an insight adjustment indicator responsive to the insight adjustment; and
pass the insight adjustment indicator to the storage layer circuitry for storage within the memory hierarchy.

15. The product of claim 14, where the instructions are further configured to cause the processor to expose, at presentation layer circuitry of the analytics processing stack, the model change indicator, the rule change indicator, the insight adjustment indicator, or any combination thereof to a representational state transfer (REST) server.

16. The product of claim 14, where the instructions are further configured to cause the processor to:
at the insight processing layer circuitry:
generate a notification responsive to the insight adjustment indicator; and send the notification to presentation layer circuitry of the analytics processing stack to indicate status for the model parameter, the rule, or both.

17. The product of claim 14, where the instructions are further configured to cause the processor to accept, configuration layer circuitry of the analytics processing stack, a configuration input implemented via an application programming interface (API) configured to provide access to the analytics model logic, the rule logic, the insight processing layer circuitry, or any combination thereof.

18. The product of claim 14, where the predetermined predictor data format comprises a predictive model markup language (PMML) format, a portable format for Analytics (PFA), or both.

19. The product of claim 14, where the instructions are further configured to cause the processor to expose, at presentation layer circuitry of the analytics processing stack, the model change indicator, the rule change indicator, the insight adjustment indicator, or any combination thereof to a representational state transfer (REST) server.

20. The product of claim 14, where the instructions are further configured to cause the processor to, at the insight processing layer circuitry:

generate a notification responsive to the insight adjustment indicator; and send the notification to presentation layer circuitry of the analytics processing stack to indicate status for the model parameter, the rule, or both.

\* \* \* \* \*